United States Patent
Hirota et al.

(10) Patent No.: US 10,114,323 B2
(45) Date of Patent: Oct. 30, 2018

(54) SHEET SIZE DETECTOR AND IMAGE PROCESSING APPARATUS

(71) Applicants: Tetsuro Hirota, Kanagawa (JP); Yu Wakabayashi, Kanagawa (JP); Shintaroh Yamada, Kanagawa (JP); Shun Kobayashi, Kanagawa (JP)

(72) Inventors: Tetsuro Hirota, Kanagawa (JP); Yu Wakabayashi, Kanagawa (JP); Shintaroh Yamada, Kanagawa (JP); Shun Kobayashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 323 days.

(21) Appl. No.: 14/641,923

(22) Filed: Mar. 9, 2015

(65) Prior Publication Data

US 2015/0268028 A1 Sep. 24, 2015

(30) Foreign Application Priority Data

Mar. 18, 2014 (JP) .................................. 2014-054716
Sep. 29, 2014 (JP) .................................. 2014-199424

(51) Int. Cl.
G03G 15/00 (2006.01)
G01B 7/02 (2006.01)

(52) U.S. Cl.
CPC ........... G03G 15/5029 (2013.01); G01B 7/02 (2013.01); *B65H 2301/13* (2013.01); *G03G 2215/00734* (2013.01)

(58) Field of Classification Search
CPC .............. B65H 63/082; B65H 2511/12; B35H 2301/13; G01N 27/72; G03G 2215/00734; G01B 7/02; G01B 7/003
See application file for complete search history.

(56) References Cited

U.S. PATENT DOCUMENTS 6,259,249 B1 * 7/2001 Miyata ................... G01B 7/003
324/207.12
6,611,138 B2 * 8/2003 Vasiloiu ............... G01D 5/2046
324/207.12

(Continued)

FOREIGN PATENT DOCUMENTS

JP 8-175745 7/1996
JP 2009-137762 6/2009

(Continued)

*Primary Examiner* — Son Le
*Assistant Examiner* — Dustin Dickinson
(74) *Attorney, Agent, or Firm* — Harness, Dickey & Pierce, P.L.C.

(57) ABSTRACT

A sheet size detector to detect a sheet size of a recording medium includes a movable member to move in a sheet size detection direction to a position corresponding to the sheet size, a magnetic flux detector including a coil disposed on a board face parallel to the sheet size detection direction to generate a magnetic flux in a direction perpendicular to the board face, and a target to oppose the board face and including a material to affect the magnetic flux. The target is different in configuration in the sheet size detection direction to change the magnetic flux in the direction perpendicular to the board face as the movable member moves. The magnetic flux detector outputs a signal corresponding to changes in magnetic flux in the direction perpendicular to the board face, and the signal corresponds to the position of the movable member.

19 Claims, 19 Drawing Sheets

(56) References Cited

U.S. PATENT DOCUMENTS

| | | | |
|---|---|---|---|
| 8,975,900 B2* | 3/2015 | Poupyrev | G06F 3/011 |
| | | | 324/633 |
| 2002/0186365 A1* | 12/2002 | Shafer | G01B 11/002 |
| | | | 356/247 |
| 2004/0103551 A1* | 6/2004 | Wahl | F16C 29/005 |
| | | | 33/707 |
| 2004/0233178 A1* | 11/2004 | Silk | G06F 1/3203 |
| | | | 345/179 |
| 2007/0069741 A1* | 3/2007 | Kleismit | H01Q 13/08 |
| | | | 324/638 |
| 2007/0133069 A1* | 6/2007 | Sunada | G03G 15/234 |
| | | | 358/498 |
| 2008/0243427 A1* | 10/2008 | Ono | G01D 5/24438 |
| | | | 702/151 |
| 2009/0267294 A1* | 10/2009 | Hojo | B65H 5/34 |
| | | | 271/265.01 |
| 2010/0156402 A1* | 6/2010 | Straubinger | G01D 5/2225 |
| | | | 324/207.25 |
| 2013/0270765 A1 | 10/2013 | Araaki et al. | |
| 2013/0322900 A1* | 12/2013 | Ogawahara | G03G 15/2042 |
| | | | 399/45 |
| 2014/0312886 A1 | 10/2014 | Hirota et al. | |

FOREIGN PATENT DOCUMENTS

| | | |
|---|---|---|
| JP | 2013-230886 | 11/2013 |
| JP | 2015-014687 | 1/2015 |

* cited by examiner

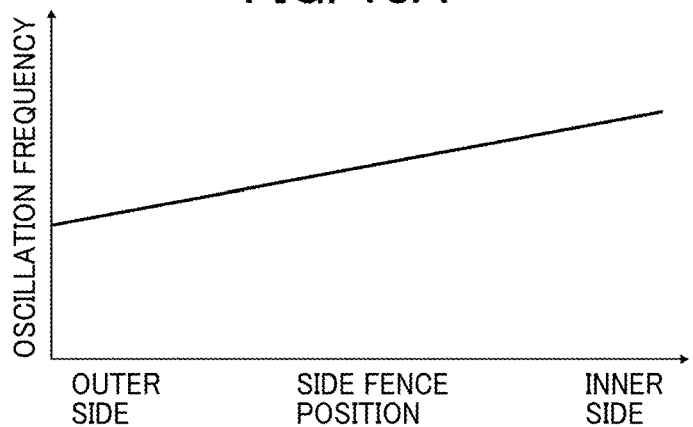
FIG. 18A
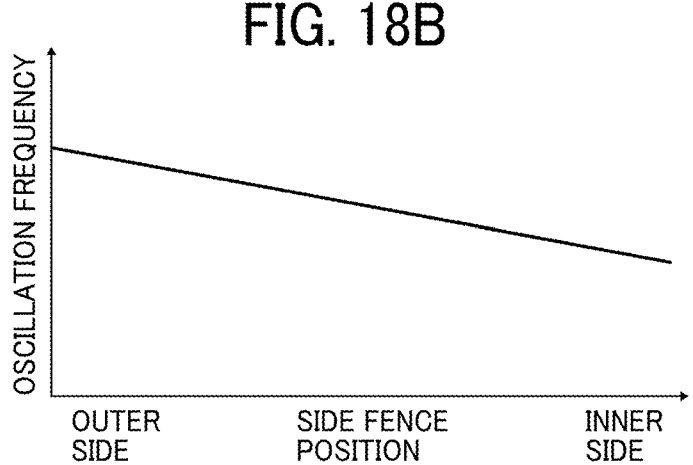
FIG. 18B
FIG. 19
| OSCILLATION FREQUENCY | LENGTH DETECTION | SHEET SIZE |
|---|---|---|
| f1-f2 | 000 | B5 |
| f2-f3 | 100 | A4 |
| f3-f4 | 100 | B4 |
| f4-f5 | 110 | A3 |
| ... | | |

| NUMBER OF PEAK DETECTION | LENGTH DETECTION | SHEET SIZE |
|---|---|---|
| 4 | 000 | POSTCARD |
| 3 | 000 | B5 |
| 2 | 100 | A4 |
| 1 | 110 | B4 |
| 0 | 111 | A3 |
| ... | | |

SHEET SIZE DETECTOR AND IMAGE PROCESSING APPARATUS

CROSS-REFERENCE TO RELATED APPLICATIONS

This patent application is based on and claims priority pursuant to 35 U.S.C. § 119(a) to Japanese Patent Application Nos. 2014-054716 filed on Mar. 18, 2014 and 2014-199424 filed on Sep. 29, 2014, in the Japan Patent Office, the entire disclosure of each of which is hereby incorporated by reference herein.

BACKGROUND

Technical Field

Embodiments of the present invention generally relate to a sheet size detector and an image processing apparatus.

Description of the Related Art

Mechanisms to detect a sheet size of a recording medium are used in apparatuses that process recording media, such as image processing apparatuses to form images on recording media and scanners to read and convert contacts of recording media into digital data.

SUMMARY

An embodiment of the present invention provides a sheet size detector to detect a sheet size of a recording medium that includes a movable member to move in a sheet size detection direction to a position corresponding to the sheet size, a magnetic flux detector including a coil disposed on a board face parallel to the sheet size detection direction to generate a magnetic flux in a direction perpendicular to the board face, and a target to oppose the board face and including a material to affect the magnetic flux. The target is different in configuration in the sheet size detection direction to change the magnetic flux in the direction perpendicular to the board face according to movement of the movable member. The magnetic flux detector outputs a signal corresponding to changes in magnetic flux in the direction perpendicular to the board face, and the signal corresponds to the position of the movable member.

In another embodiment, a sheet processing apparatus includes the sheet size detector described above.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 18A and 18B are graphs of oscillation frequency of a magnetic flux sensor corresponding to positions of a side fence of a bypass tray according to an embodiment;

FIG. 19 is a table in which sheet size is correlated with data for sheet size determination according to an embodiment;

DETAILED DESCRIPTION

Figure 1:
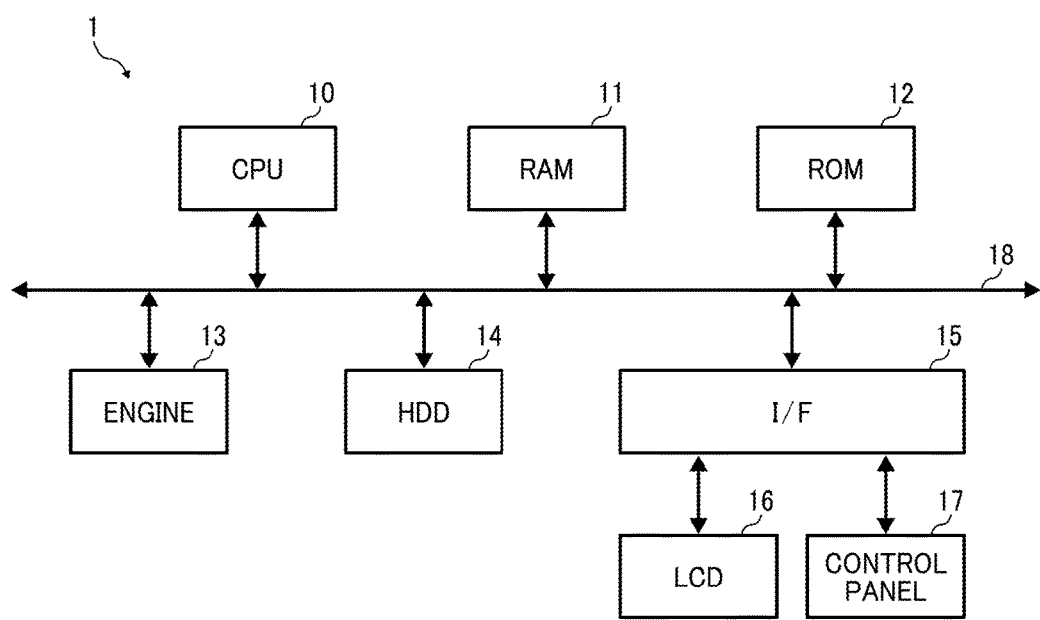
FIG. 1 is a schematic block diagram of a hardware configuration of an image processing apparatus according to an embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

An aspect of embodiments described below is sheet size detection of recording media used to output images or size of documents copied or scanned. Mechanisms to detect sheet size are generally provided to trays on which sheets of recording media or documents are placed. Due to design limitations, for example, to make the tray compact, a compact detector is preferable. Embodiments described below concern a sheet size detector that includes a movable member to move according to sheet size and an oscillator circuit including a coil, to output signals according to which sheet size is detected. In a sheet size detector that employs an oscillator circuit including a coil winding in annular layers, it is difficult to keep the tray compact in height.

Additionally, in cases where signals from the oscillator circuit are adjusted in the sheet size detector using the annular coil winding in layers, it is difficult to enhance detection accuracy since the number of winding of the coil is to be adjusted in accordance with the position of the movable member.

First Embodiment

Referring now to the drawings, wherein like reference numerals designate identical or corresponding parts throughout the several views thereof, and particularly to FIG. 1, an image processing apparatus according to an embodiment of the present invention is described. The image processing apparatus according to the present embodiment is a multifunction peripheral (MFP), for example.

FIG. 1 is a schematic block diagram of a hardware configuration of an image processing apparatus 1 according to the present embodiment.

As illustrated in FIG. 1, the image processing apparatus 1 includes an engine 13 to implement image formation in addition to a configuration similar to that of data processing terminals such as typical servers and computers. That is, the image processing apparatus 1 includes a central processing unit (CPU) 10, a random access memory (RAM) 11, a read only memory (ROM) 12, the engine 13, a hard disk drive (HDD) 14, and an interface (I/F) 15, which are connected to each other via a bus 18. To the interface 15, further a liquid crystal display (LCD) 16 and a control panel 17 are connected.

The CPU 10 is a computation device and controls actions of the entire image processing apparatus 1. The RAM 11 is a volatile memory capable of high-speed data reading and writing. The RAM 11 is used as workspace when the CPU 10 processes data. The ROM 12 is a non-volatile memory dedicated to reading out and stores programs such as firmware. The engine 13 is to execute image formation in the image processing apparatus 1.

The HDD 14 is a non-volatile memory capable of data reading and writing, and an operating system (OS), various types of control programs, application programs, and the like are stored therein. The interface 15 connects the bus 18 to the various types of hardware and networks and controls the bus 18, the hardware, and the networks. The LCD 16 is a visual user interface for users to check a status of the image processing apparatus 1. The control panel 17 is a user interface for users to input data to the image processing apparatus 1 and includes a keyboard, a mouse, and the like.

In the above-described hardware configuration, the CPU 10 executes computation according to programs read out into the RAM 11 from the ROM 12, the HDD 14, or recording media such as optical disks. Then, control software is implemented. With the implement control software and the above-described hardware configuration, a function block for the capabilities of the image processing apparatus 1 is configured.

Next, descriptions are given below of a functional configuration of the image processing apparatus 1 with reference to FIG. 2.

Figure 2:
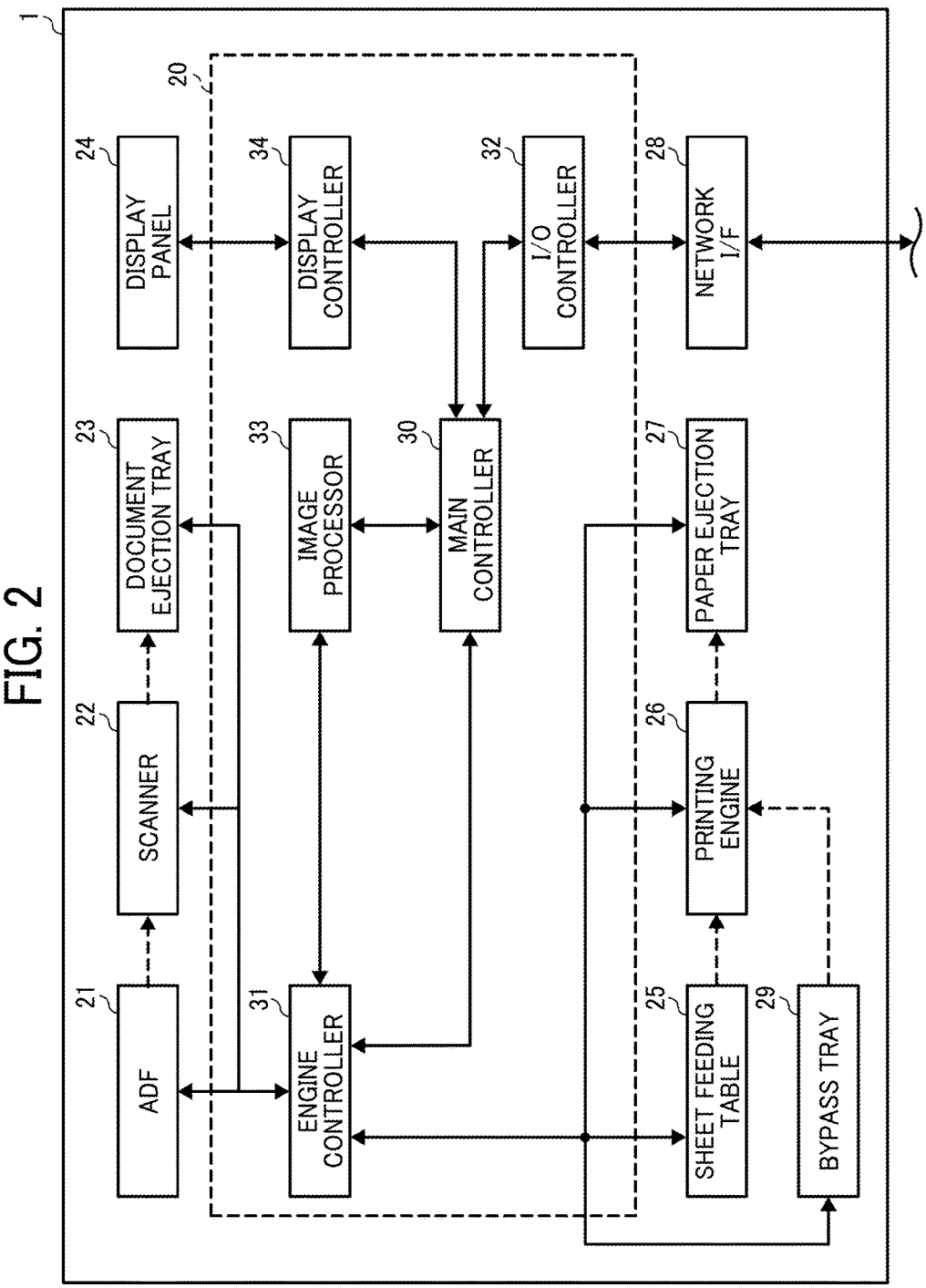
FIG. 2 is a schematic block diagram of a functional configuration of the image processing apparatus illustrated in FIG. 1.

FIG. 2 is a schematic block diagram of the functional configuration of the image processing apparatus 1 according to the present embodiment.

In the configuration illustrated in FIG. 2, the image processing apparatus 1 includes a controller 20, an automatic document feeder (ADF) 21, a scanner 22, a document ejection tray 23, a display panel 24, a sheet feeding table 25, a printing engine 26, a paper ejection tray 27, a network interface (I/F) 28, and a bypass tray 29 (or a multi-purpose tray).

The controller 20 includes a main controller 30, an engine controller 31, an input/output (I/O) controller 32 an image processor 33, and a display controller 34. In the configuration illustrated in FIG. 2, the image processing apparatus 1 is a multifunction peripheral including the scanner 22 and the printing engine 26. It is to be noted that, in FIG. 2, solid liens represent electrical connections, and broken lines represent flow of sheets.

The display panel 24 serves as both of an output interface to visually display the state of the image processing apparatus 1 and an input interface (i.e., a control panel) such as a touch panel for users to directly operate the image processing apparatus 1 or input data into the image processing apparatus 1. The network interface 28 in an interface for the image processing apparatus 1 to communicate with other devices. Examples usable as the network interface 28 include Ethernet® and USB (Universal Serial Bus) interfaces.

The controller 20 is configured by a combination of software and hardware. Specifically, the controller 20 is constructed with the control software implemented by computation of the CPU 10 and the hardware such as integrated circuits. The controller 20 controls the image processing apparatus 1 entirely.

The main controller 30 controls, that is, gives commands to, respective units of the controller 20. The engine controller 31 controls or drives driving units such as the printing engine 26, the scanner 22, and the like. The I/O controller 32 inputs signals and commands received via the network interface 28 and networks to the main controller 30. The main controller 30 controls the I/O controller 32 and accesses other devices via the network interface 28.

The image processor 33 is governed by the main controller 30 and generates drawing data according to print data included in input print jobs. The drawing data is data for the printing engine 26 to draw images in image formation. The print data included in print jobs means image data in a data format recognizable by the image processing apparatus 1, converted by printer drivers installed in data processing devices such as computers. The display controller 34 displays data on the display panel 24 or reports, to the main controller 30, data input via the display panel 24.

When the image processing apparatus 1 operates as a printer, the I/O controller 32 receives a print job via the network interface 28. The I/O) controller 32 forwards the print job to the main controller 30. Receiving the print job, the main controller 30 causes the image processor 33 to generate drawing data according to the print data included in the print job.

According to the drawing data generated by the image processor 33, the engine controller 31 causes the printing engine 26 to form an image on the sheet transported from the sheet feeding table 25 or the bypass tray 29. In other words, the printing engine 26 serves as an image forming unit. After the printing engine 26 forms an image thereon, the sheet is ejected to the paper ejection tray 27.

When the image processing apparatus 1 operates as a scanner, the display controller 34 or the I/O controller 32 transmits a scanning instruction signal to the main controller 30 according to a scanning instruction input by a user from the display panel 24 or transmitted via the network interface 28 from an external device such as a computer. The main controller 30 controls the engine controller 31 according to the scanning instruction signal received.

The engine controller 31 drives the ADF 21 to transport documents set therein to the scanner 22. Additionally, the engine controller 31 drives the scanner 22 to scan the documents thus transported from the ADF 21. When documents are set not in the ADF 21 but in the scanner 22, the scanner 22 scans the documents, controlled by the engine controller 31. Thus, the scanner 22 serves as an image reading device.

Specifically, the scanner 22 includes an imaging element such as a charge-coupled device (CCD) to optically scan the documents. The engine controller 31 transmits the data scanned by the scanner 22 to the image processor 33. The image processor 33 generates image data according to the scanned data transmitted from the engine controller 31, controlled by the main controller 30. The image data generated by the image processor 33 is stored on a recording medium such as the HDD 14 inserted in the image processing apparatus 1. In other words, the scanner 22, the engine controller 31, and the image processor 33 in combination function as a document reader.

Instructed by the user, the image data generated by the image processor 33 is either stored in the HDD 14 or the like, or transmitted to an external device via the I/O controller 32 and the network interface 28. Thus, the ADF 21 and the engine controller 31 in combination function as an image input.

Further, when the image processing apparatus 1 operates as a copier, the image processor 33 generates drawing data based on the scanned data transmitted by the engine controller 31 from the scanner 22 or data generated by the image processor 33. According to the drawing data, the engine controller 31 drives the printing engine 26 similar to printing.

Next, descriptions are given below of mechanical structures of the printing engine 26 and peripheries thereof according to the present embodiment with reference to FIG. 3.

Figure 3:
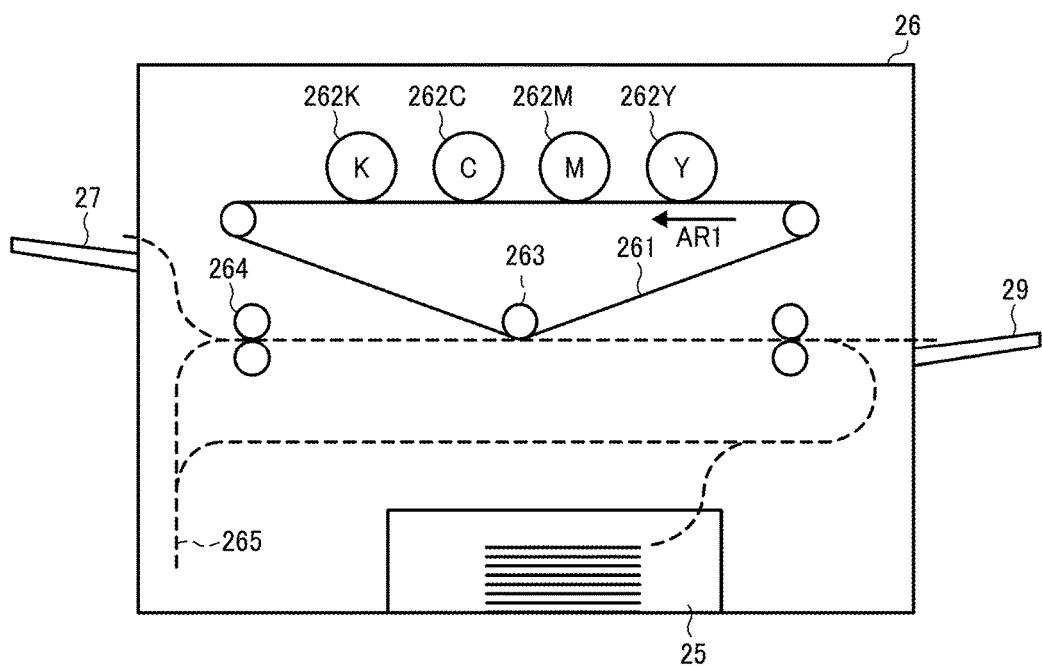
FIG. 3 is a schematic diagram of a mechanical configuration of the image processing apparatus illustrated in FIG. 1.

As illustrated in FIG. 3, the printing engine 26 includes photoconductor drums 262 (262Y, 262M, 262C, and 262K) for respective colors, arranged along a conveyance belt 261 serving as an endless conveyor. This is a structure generally called "tandem type".

Specifically, the conveyance belt 261 is an intermediate transfer belt to bear an intermediate transfer image (i.e., a toner image) to be transferred onto a sheet of recording media such as paper, overhead projector film, and the like, fed from the sheet feeding table 25 or the bypass tray 29. The photoconductor drums 262Y, 262M, 262C, and 262K are arranged in that order from the upstream side in the direction indicated by arrow AR1 illustrated in FIG. 3, in which the conveyance belt 261 transports the image.

Respective color toner images developed on the photoconductor drums 262 are transferred therefrom and superimposed one on another on the conveyance belt 261 into a multicolor toner image (e.g., a full-color image). In FIG. 3, broken lines represents a conveyance route of sheets. At a transfer position where the conveyance belt 261 is closest to the conveyance route of sheets, the full-color image is transferred by a transfer roller 263 from the conveyance belt 261 onto the sheet.

The sheet carrying the image is transported further and, a fixing roller 264 fixes the image on the sheet. Then, the sheet is output onto the paper ejection tray 27. In duplex printing, after an image is fixed on one side of the sheet, the sheet is transported to a reversal path 265, turned upside down, and transported again to the transfer position facing the transfer roller 263. Each of the sheet feeding table 25, the bypass tray 29, and the ADF 21 has a capability to detect size of a sheet set thereon.

Descriptions are given below of sheet size detection of the bypass tray 29.

Figure 4A:
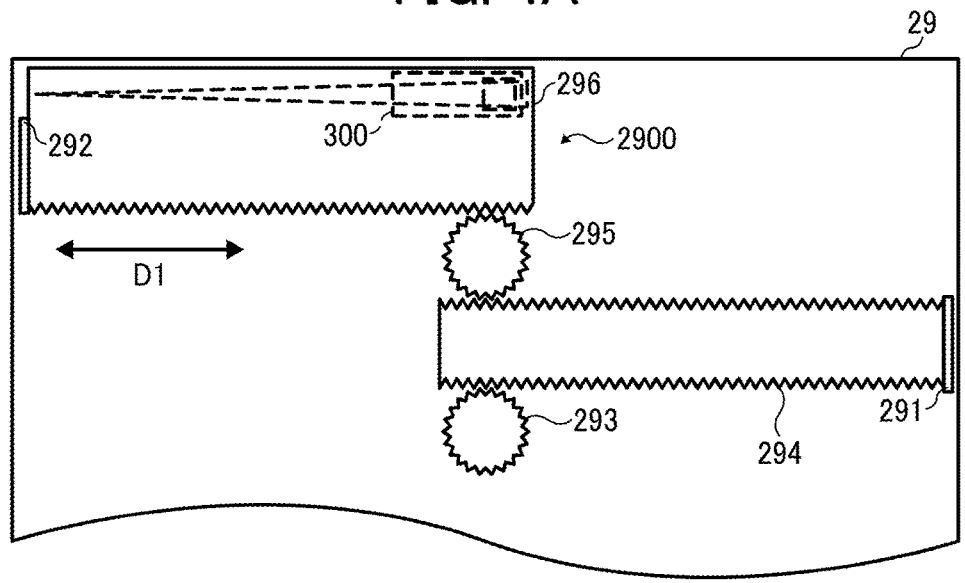
FIGS. 4A and 4B are views of a sheet size detector of a bypass tray according to an embodiment.

FIG. 4A is a view of a mechanism of sheet size detection of the bypass tray 29 according to the present embodiment, and a face of the bypass tray 29 on which sheets are placed (hereinafter "sheet mounting face") is on the front side of the paper on which FIG. 4A is drawn.

Sheets set on the bypass tray 29 are detected by a sheet sensor, according to which a motor is driven. Driven by the motor, a driving pinion gear 293 rotates. As the driving pinion gear 293 rotates, a rack 294 moves from the right to the left in FIG. 4A, and a side fence 291 integrated with the rack 294 moves from the right to the left in FIG. 4A.

An intermediate pinion gear 295 is disposed on a side of the rack 294 opposite a side on which the driving pinion gear 293 is provided. As the rack 294 moves, the intermediate pinion gear 295 rotates, and further a rack 296 moves from the left to the right in which FIG. 4A. Then, a side fence 292 integrated with the rack 296 moves from the left to the right in FIG. 4A. The driving pinion gear 293, the rack 294, and the intermediate pinion gear 295 serves as a mechanism to move the rack 296 in a sheet width direction indicated by arrow D1 in FIG. 4A.

A sheet end sensor is contained in each of the side fences 291 and 292. When the side fences 291 and 292 move from both sides to a center portion of the bypass tray 29 and contact ends of the sheet, the driving pinion gear 293 stops rotating according to detection by the sheet end sensors.

Figure 4B:
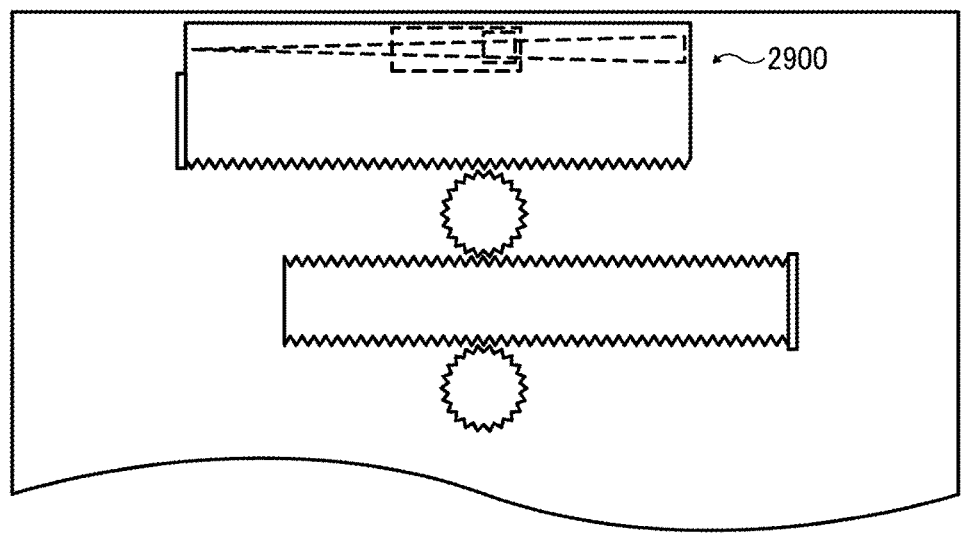

Then, the racks 294 and 296 and the side fences 291 and 292 stop moving. FIG. 4B illustrates the respective positions of the above-described components at that time.

Thus, the ends of sheets are detected a combination of the side fences 291 and 292, the driving pinion gear 293, the racks 294 and 296, and the intermediate pinion gear 295. With this configuration, the rack 296 moves according to a sheet width, which is a length in the lateral direction indicated by arrow D1 (hereinafter "direction D1") in FIGS. 4A and 4B. In the present embodiment, sheet size is recognized by detecting the position of the rack 296 in the sheet width direction D1.

Accordingly, the rack 296 and a body of the bypass tray 29 include elements to detect sheet size, namely, an element that moves together with the rack 296 and an element secured to the body of the bypass tray 29 (hereinafter collectively "detecting portion 300"). As the rack 296 moves, the relative positions of the respective elements change as illustrated in FIGS. 4A and 4B. Then, a sensor outputs signals corresponding to changes in the relative positions. A combination of the rack 296, the mechanism to move the rack 296, and the detecting portion 300 is referred to as a sheet size detector 2900.

Figure 5A:
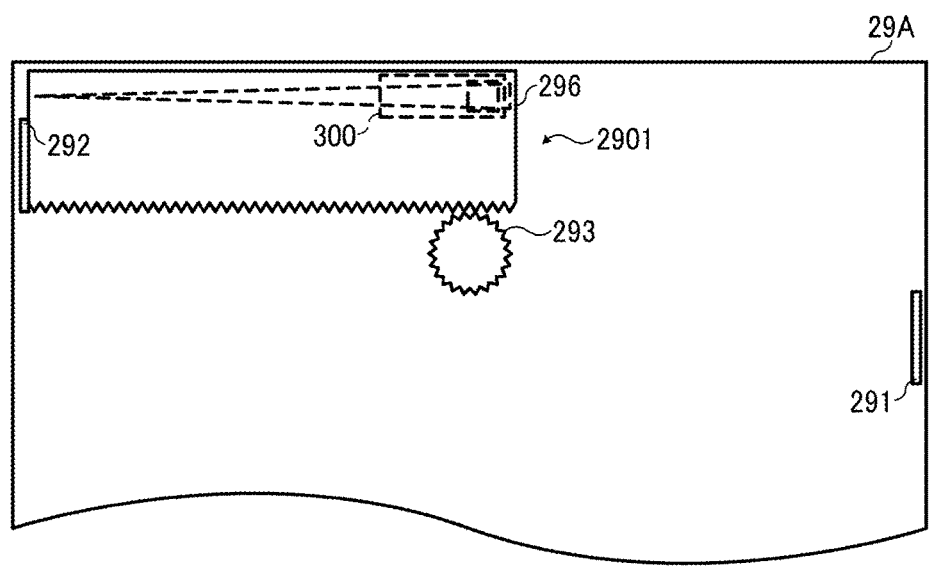
FIGS. 5A and 5B are views of a sheet size detector according to another embodiment.
Figure 5B:
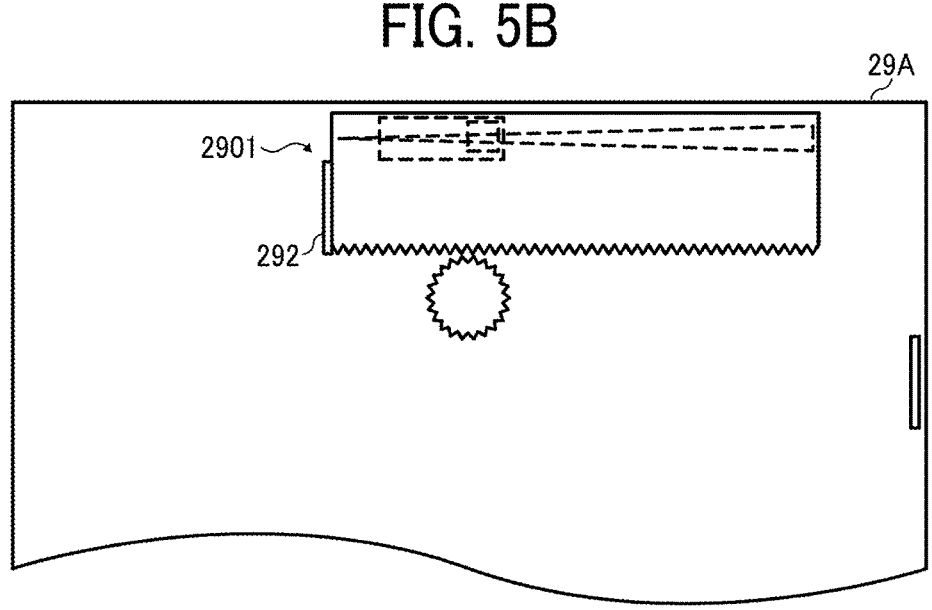

FIGS. 5A and 5B are views of a bypass tray 29A including a sheet size detector 2901 as a variation of the configuration illustrated in FIGS. 4A and 4B.

In the configuration illustrated in FIG. 5A, the rack 294 and the intermediate pinion gear 295 are omitted from the mechanism to move the rack 296, and the side fence 291 is secured to the bypass tray 29. As the driving pinion gear 293 rotates, the rack 296 moves from the left to the right in FIG. 5A.

In the configuration illustrated in FIG. 5A, sheets are set along the side fence 291. The rack 296 moves from the left to the right in the drawing and stops when the side fence 292 contacts the sheets. FIG. 5B illustrates the respective positions of the above-described components at that time.

Similarly, in the configuration illustrated in FIGS. 5A and 5B, the rack 296 moves according to the sheet width, which is the lateral direction in FIGS. 5A and 5B. Accordingly, the detecting portion 300 outputs signals corresponding to relative positions of a component that moves together with the rack 296 and a component secured to a body of the bypass tray 29A.

Figure 6A:
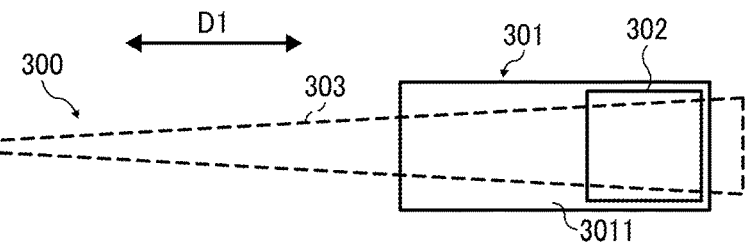
FIGS. 6A, 6B, and 6C illustrate relative positions of components of a sheet size detector according to an embodiment.
Figure 6B:
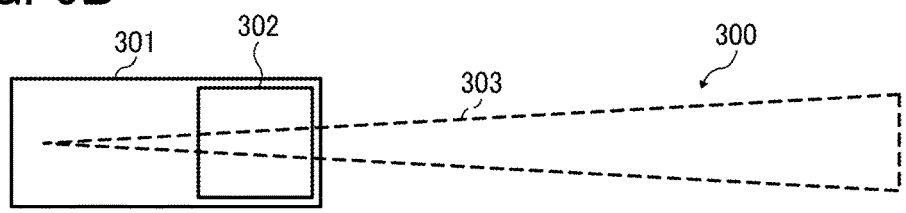

A principle of sheet size detection by the detecting portion 300 according to the present embodiment is described below. FIGS. 6A and 6B illustrate relative positions of the components of the detecting portion 300.

As illustrated in FIG. 6A, the detecting portion 300 includes a target 303 that moves together with the rack 296 and a magnetic flux sensor 301 secured to the body of the bypass tray 29. The magnetic flux sensor 301 includes a planar coil 302 on a front face 3011 (in FIG. 6A) of a printed circuit board serving as the magnetic flux sensor 301.

The planar coil 302 is coil made from conducting wire (signal wire) printed in a planar pattern on a board serving as the magnetic flux sensor 301. The planar coil 302 has an inductance L that changes depending on a state of magnetic flux in a space opposed to the plane bearing the planar coil 302 (i.e., the front face 3011 of the magnetic flux sensor 301). As a result, the magnetic flux sensor 301 in the present embodiment outputs signals having a frequency corresponding to the magnetic flux state of the space opposed to the face bearing the planar coil 302.

Figure 6C:
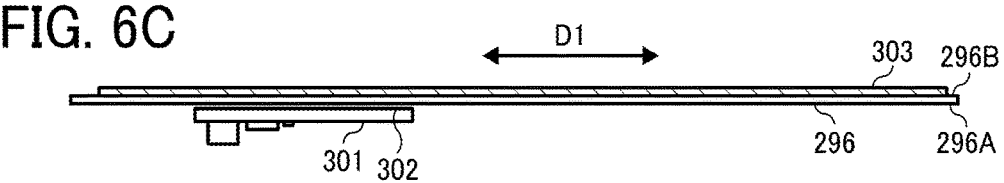

FIG. 6C is a side view of the detecting portion 300 as viewed in a direction perpendicular to the direction in which the target 303 and the planar coil 302 are arranged.

In the detecting portion 300, the target 303 is opposed, either directly or indirectly, to the face bearing the planar coil 302. It is to be noted that, in the configuration illustrated in FIG. 6C, the target 303 is opposed the planar coil 302 through the rack 296. Specifically, the front face 3011 of the magnetic flux sensor 301 bearing the planar coil 302 faces a first face 296A of the rack 296, and the target 303 is on a second face 296B of the rack 296 opposite the first face 296A. The target 303 is on the second face 296B of the rack 296, which is on the side opposite the front face 3011 bearing the planar coil 302, and long in the direction D1 in which the rack 296 moves. In the configuration illustrated in FIG. 6C, the target 303 is planar and kept compact in the direction perpendicular to the sheet mounting face (i.e., sheet setting plane) of the bypass tray 29. Alternatively, when space sufficient for the target 303 is secured, the target 303 can be disposed on the first face 296A of the rack 296 facing the magnetic flux sensor 301.

Referring to FIGS. 6A and 6B, the target 303 is shaped such that a width (length in the direction perpendicular to the direction D1) thereof changes in the direction D1 in which the rack 296 moves. Accordingly, the target 303 opposed to the planar coil 302 changes in area depending on the position of the rack 296 as illustrated in FIGS. 6A and 6B. In other words, the target 303 is different in configuration (e.g., shape, size, material, relative position from the planar coil 302, and the like) in the direction D1, in which the rack 296 moves, and designed to change the magnetic flux of the space opposed to the planar coil 302 as the rack 296 moves.

As described above, the magnetic flux sensor 301 including the planar coil 302 outputs signals having the frequency corresponding to the magnetic flux state of the space opposed to the front face 3011 bearing the planar coil 302. Therefore, when the target 303 is made of a material to affect the magnetic flux in accordance with the area thereof, the magnetic flux sensor 301 outputs signals having the frequency corresponding to the position of the rack 296.

That is, the magnetic flux sensor 301 according to the present embodiment outputs signals having the frequency corresponding to the size of a target sheet. The engine controller 31 processes the frequency of signal output from the magnetic flux sensor 301 to enable the controller 20 to recognize the size of the sheet set on the bypass tray 29. Additionally, disposing the target 303 on the second face 296B of the rack 296 on the side opposite the magnetic flux sensor 301 is advantageous in preventing contact between the target 303 and the planar coil 302, thereby protecting the patterns and inhibiting short circuit.

It is to be noted that the rack 296 can be made of or include an insulator that is nonmagnetic, such as resin, glass, plastic, and the like.

Examples of material of the target 303, that is, materials to affect the magnetic flux in accordance with the area, include conductive magnetic materials such as iron, non-conductive, magnetic materials such as ferrite, and nonmagnetic, conductive materials such as aluminum and copper.

Magnetic materials such as ferrite increase the magnetic flux as the area increases. Accordingly, when the state in FIG. 6A is compared with that in FIG. 6B, for example, the inductance L of the planar coil 302 is greater in the state in FIG. 6A, and thus the frequency of the signal from the magnetic flux sensor 301 lowers.

It is to be noted that magnetic materials that are conductive induce eddy current therein according to the magnetic flux and have an effect to cancel the magnetic flux. Accordingly, when a magnetic material is used for the target 303, use of an insulator is advantageous in emphasizing the change in frequency in accordance with the area of the target 303 opposed to the planar coil 302.

By contrast, materials that are nonmagnetic as well as conductive weaken the magnetic flux as the area increases. Accordingly, when the state in FIG. 6A is compared with that in FIG. 6B, the inductance L of the planar coil 302 is smaller in FIG. 6A, and thus the frequency of the signal from the magnetic flux sensor 301 rises.

Next, descriptions are given below of an internal configuration of the engine controller 31 to process signals output from the magnetic flux sensor 301.

Figure 7:
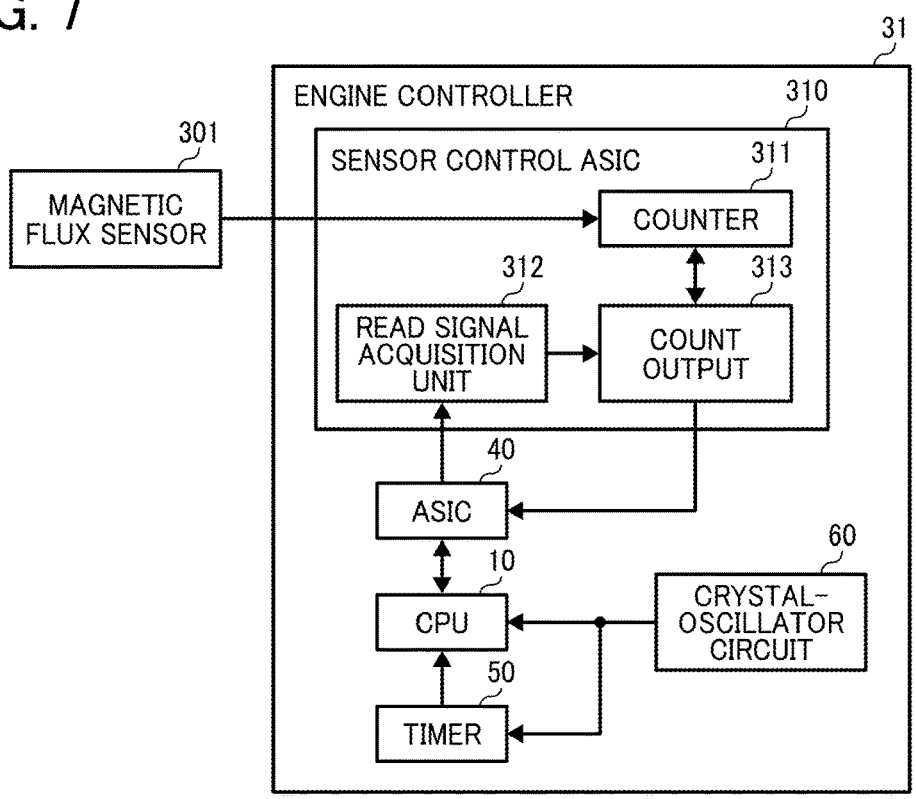
FIG. 7 is a block diagram illustrating a control configuration of a magnetic flux sensor according to an embodiment.

FIG. 7 is a schematic block diagram of the engine controller 31 to process signals output from the magnetic flux sensor 301.

As described above, the engine controller 31 includes the CPU 10 that execute computation according to programs and the hardware such as integrated circuits and further includes an application specific integrated circuit (ASIC) 40, a timer 50, a crystal-oscillator circuit 60, and a sensor control ASIC 310.

The ASIC 40 functions as a connection interface between a system bus to which the CPU 10 and the like are connected and another device. The timer 50 outputs an interrupt signal to the CPU 10 each time the count of reference clock input from the crystal-oscillator circuit 60 reaches a predetermined count. The crystal-oscillator circuit 60 generates a reference clock to operate respective elements inside the controller 20.

In response to the interrupt signal input from the timer 50, the CPU 10 that operates to implement the engine controller 31 outputs a read signal to read a signal count value of the magnetic flux sensor 301 from the sensor control ASIC 310. The sensor control ASIC 310 acquires detection signals output from the magnetic flux sensor 301 and converts the signals into data processable inside the engine controller 31.

In the configuration illustrated in FIG. 7, the sensor control ASIC 310 includes a counter 311, a read signal acquisition unit 312, and a count output 313. The magnetic flux sensor 301 according to the present embodiment is an oscillator circuit that outputs rectangular waves having the frequency corresponding to changes in magnetic flux in the space opposed to the face bearing the planar coil 302. The counter 311 increments the value according to the rectangular wave output from the magnetic flux sensor 301.

The read signal acquisition unit 312 acquires, from the CPU 10 via the ASIC 40, the read signal, which is a command to acquire the count value of the counter 311. Acquiring the read signal from the CPU 10, the read signal acquisition unit 312 inputs, to the count output 313, a signal instructing output of the count value. According to the signal input by the read signal acquisition unit 312, the count output 313 outputs the count value of the counter 311.

It is to be noted that the CPU 10 has an access to the sensor control ASIC 310, for example, via a register. Accordingly, the above-described read signal is executed by writing, with the CPU 10, a value in a predetermined register included in the sensor control ASIC 310. Additionally, the count value output from the count output 313 is stored in a predetermined register included in the sensor control ASIC 310, and the CPU 10 acquires the count value.

Next, descriptions are given below of an internal configuration of the magnetic flux sensor 301 according to the present embodiment with reference to FIG. 8.

Figure 8:
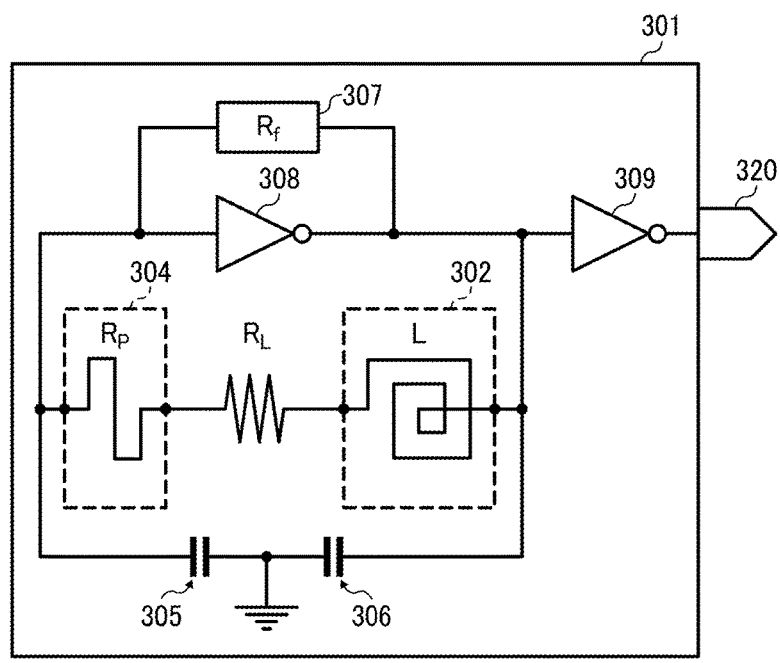
FIG. 8 illustrates circuitry of a magnetic flux sensor illustrated in FIG. 7.

As illustrated in FIG. 8, the magnetic flux sensor 301 is an oscillator circuit based on a Colpitts-type LC oscillator circuit and includes a planar coil 302, an adjusting resistor 304 shaped in a planar pattern, first and second capacitors 305 and 306, a feedback resistor 307, unbuffered integrated circuits (ICs) 308 and 309, and an output terminal 320.

The planar coil 302 is a coil made from conducting wire (signal wire) printed in a planar pattern on a board serving as the magnetic flux sensor 301. As illustrated in FIG. 8, the planar coil 302 has the inductance L attained by the coil, and the inductance L changes in accordance with the magnetic flux in the space opposed to the face bearing the coil.

Similar to the planar coil 302, the adjusting resistor 304 is a resistor made of a planar pattern of conducting wire printed on the board. The adjusting resistor 304 in the present embodiment has a serpentine or zigzag pattern to better inhibit flow of electrical current compared with a resistor having a linear pattern. Referring to FIG. 8, the adjusting resistor 304 has a resistance value $R_p$. The planar coil 302 and the adjusting resistor 304 are connected in series with each other.

The first and second capacitors 305 and 306 serve as a capacitance and a part of the Colpitts-type LC oscillator circuit including the planar coil 302. Accordingly, the first and second capacitors 305 and 306 are connected serially with the planar coil 302 and the adjusting resistor 304. A loop including the planar coil 302, the adjusting resistor 304, and the first and second capacitors 305 and 306 serves as a resonance current loop.

The feedback resistor 307 is inserted to stabilize a bias voltage. With a function of the unbuffered ICs 308 and 309, fluctuations in potential of a part of the resonance current loop are output as a rectangular wave corresponding to the resonance frequency from the output terminal 320. With this configuration, the magnetic flux sensor 301 oscillates at the frequency corresponding to the inductance L, the resistance value $R_p$, and a capacitance C of the first and second capacitors 305 and 306.

Figure 9:
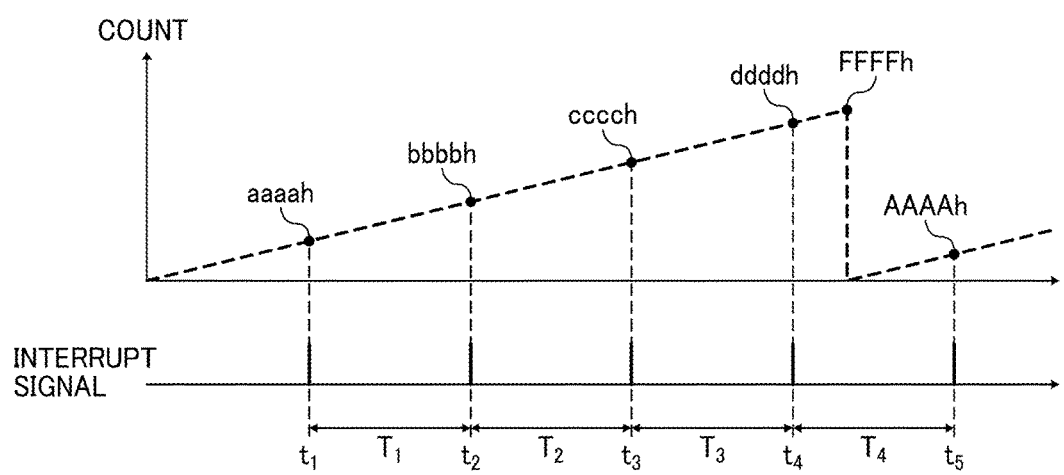
FIG. 9 is a chart illustrating an example of count of signals from a magnetic flux sensor according to an embodiment.

FIG. 9 is a chart illustrating count of output signal of the magnetic flux sensor 301, counted by the function of the sensor control ASIC 310.

If the position of the target 303 opposed to the magnetic flux sensor 301 does not change, the magnetic flux sensor 301 keeps oscillating at a constant frequency basically. Consequently, the count value of the counter 311 increases constantly with elapse of time as illustrated in FIG. 9.

Additionally, receiving the interrupt signal from the timer 50, the CPU 10 outputs the read signal to the sensor control ASIC 310 and acquires the count value of the counter 311 at that time. For example, in FIG. 9, at time points $t_1$, $t_2$, $t_3$, $t_4$, and $t_5$, count values aaaah, bbbbh, ccch, ddddh, and AAAAh are acquired respectively.

Acquiring the count values at the respective time points, the CPU 10 calculates the frequency in periods $T_1$, $T_2$, $T_3$, and $T_4$ shown in FIG. 9, respectively. The timer 50 in the present embodiment outputs the interrupt signal when counting the reference clock for the period equivalent of 2 milliseconds (ms). Accordingly, the CPU 10 divides the count values of the counter 311 in the respective periods with 2 (ms), thereby calculating oscillation frequency f (Hz) of the magnetic flux sensor 301 in the periods $T_1$, $T_2$, $T_3$, and $T_4$ respectively.

Additionally, as illustrated in FIG. 9, the upper limit of the count of the counter 311 is FFFFh in the present embodiment. Accordingly, in calculating the oscillation frequency f (Hz) in the period $T_4$, the CPU 10 divides with 2 (ms) the sum of the AAAAh and a value obtained by deducting ddddh from FFFFh.

Figure 10:
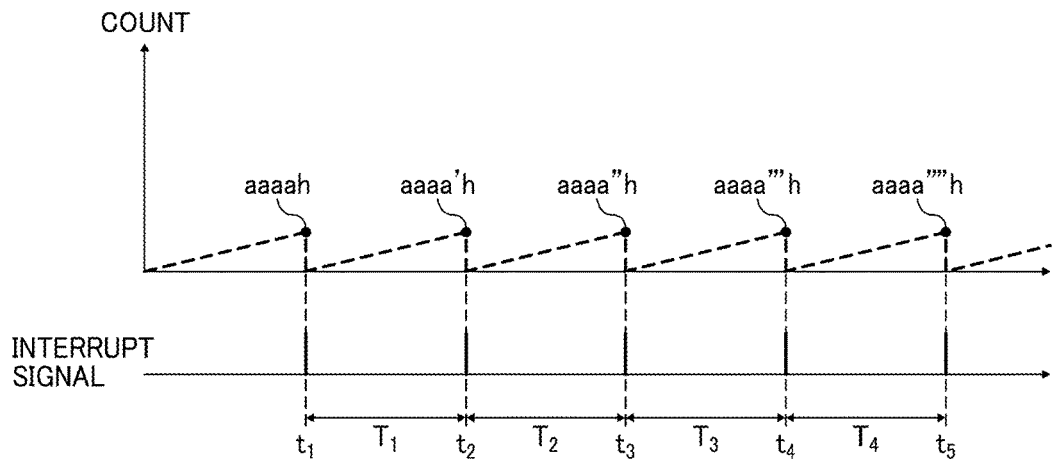
FIG. 10 is a chart illustrating another example of count of signals from a magnetic flux sensor according to an embodiment.

FIG. 10 is a chart illustrating another example of count of the magnetic flux sensor 301, counted by the sensor control ASIC 310.

In the case illustrated in FIG. 10, in the sensor control ASIC 310, the counter 311 resets the count value after the count output 313 reads out the count value. For the resetting, the count output 313 may input a reset signal to the counter 311 after reading out the count value. Alternatively, the counter 311 may include a capability to resetting the count value each time the count value is read out.

In the configuration shown in FIG. 10, the count values acquired at the respective time points are the values counted in the periods $T_1$, $T_2$, $T_3$, and $T_4$, respectively. Accordingly, the CPU 10 divides with 2 (ms) the count value acquired at each timing, thereby calculating the oscillation frequency f (Hz).

Thus, the engine controller 31 according to the present embodiment acquires the frequency of signals generated by oscillation of the magnetic flux sensor 301 and can determine, based on the result of acquisition, a phenomenon corresponding to the oscillation frequency of the magnetic flux sensor 301. Then, as described above with reference to FIGS. 4A, 4B, 5A, and 5B, the magnetic flux sensor 301, which is a part of the detecting portion 300, outputs signals having the frequency corresponding to the position of the rack 296 that moves according to sheet end detection. Accordingly, the main controller 30, which acquires data from the engine controller 31, has a capability to recognize the size of the sheet set on the bypass tray 29.

The magnetic flux sensor 301 oscillates at the frequency corresponding to the magnetic flux of the planar coil 302. Additionally, the crystal-oscillator circuit 60 oscillates at a predetermined frequency. The magnetic flux sensor 301 and the crystal-oscillator circuit 60 both, however, are dependent on temperature of the environment therearound. That is, the oscillation frequency thereof fluctuates in accordance with ambient temperature.

Figure 11:
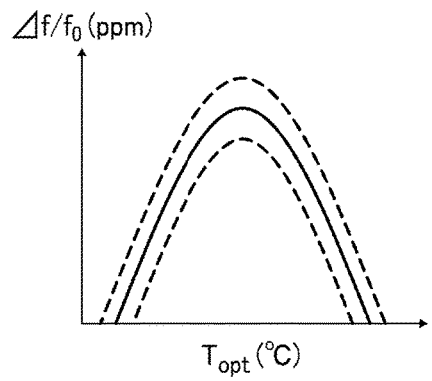
FIG. 11 is a graph illustrating temperature characteristics of oscillation frequency of a crystal-oscillator circuit according to an embodiment.

FIG. 11 is a graph illustrating temperature characteristics of the crystal-oscillator circuit 60.

As illustrated in FIG. 11, the crystal-oscillator circuit 60 has temperature characteristics such that the frequency thereof draws a parabola peaked (hereinafter also "peak temperature") at a certain temperature ($T_{opt}$).

For the engine controller 31 to detect the sheet size with a higher degree of accuracy according to the signal from the magnetic flux sensor 301, it is preferred that changes in oscillation frequency in response to temperature changes be smaller. Additionally, as described above, the engine controller 31 calculates the oscillation frequency by acquiring, at each 2 ms, the count value counted by the timer 50 and dividing the count value with 2 ms.

The timer 50 counts 2 ms according to the reference clock input from the crystal-oscillator circuit 60. Accordingly, if the oscillation frequency of the crystal-oscillator circuit 60 fluctuates due to the temperature characteristics illustrated in FIG. 11, the duration of counting 2 ms fluctuates as long as the count values for 2 ms are identical. This causes errors in oscillation frequency f of the magnetic flux sensor 301 calculated by the CPU 10.

If the temperature characteristics of the magnetic flux sensor 301 are similar to those of the crystal-oscillator circuit 60 shown in FIG. 11, the above-described errors in calculation of the oscillation frequency can be canceled. That is, even if the oscillation frequency of the crystal-oscillator circuit 60 fluctuates due to temperature changes, fluctuations in the count values counted by the counter 311 in the duration of counting 2 ms are smaller as long as the oscillation frequency f of the magnetic flux sensor 301 fluctuates similarly. Accordingly, errors can be smaller in the subsequent calculation of the oscillation frequency f of the magnetic flux sensor 301.

The magnetic flux sensor 301 according to the present embodiment is described in further detail below.

In the magnetic flux sensor 301, by application of power supply voltage, electrical current (hereinafter simply "current") flows through the planar coil 302. The current causes a magnetic flux in a predetermined direction, and the magnetic flux sensor 301 outputs from the output terminal 320 a signal having the frequency corresponding to the magnetic flux in the range of action of the magnetic flux.

Initially, the oscillation frequency of the LC oscillator circuit of the magnetic flux sensor 301 is described. When the circuit resistance $R_L$ caused by the conducting wire and the like of the circuit is considered, the oscillation frequency $f_0$ of the LC oscillator circuit is expressed as Formula 1 below.

$$f_0 = \frac{1}{2\pi\sqrt{LC}} \cdot \sqrt{1 - R_L^2 \frac{C}{4L}} \qquad (1)$$

Since the oscillation frequency f of the magnetic flux sensor 301 is expressed as a function of the inductance L attained by the planar coil 302, the capacitance C of the first and second capacitors 305 and 306, and the circuit resistance $R_L$, temperature characteristics of the parameters "L", "C", and "$R_L$" in Formula 1 are considered in adjusting temperature characteristics of the oscillation frequency f of the magnetic flux sensor 301.

Figure 12:
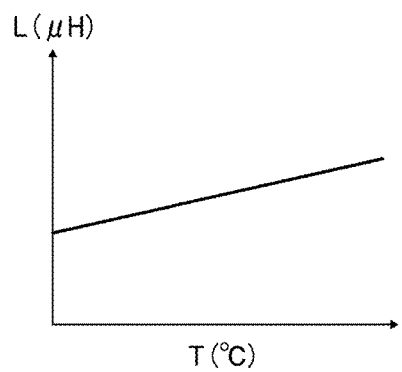
FIG. 12 is a graph illustrating temperature characteristics of inductance of coil according to an embodiment.

FIG. 12 is a graph illustrating temperature characteristics of the inductance L of the planar coil 302. Referring to FIG. 12, as the printed circuit board expands in response to rise in temperature (T), the coil size increases, and accordingly the inductance L of the planar coil 302 increases.

Figure 13:
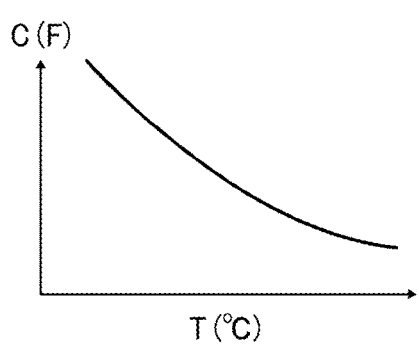
FIG. 13 is a graph illustrating temperature characteristics of a capacitor according to an embodiment.

FIG. 13 is a graph illustrating temperature characteristics of the capacitance C of the first and second capacitors 305 and 306. As illustrated in FIG. 13, the capacitance C of the first and second capacitors 305 and 306 decreases in response to temperature rise.

Figure 14:
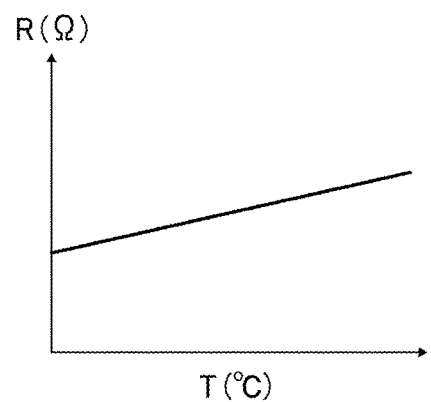
FIG. 14 is a graph illustrating temperature characteristics of a resistor according to an embodiment.

FIG. 14 is a graph illustrating temperature characteristics of the circuit resistance $R_L$. As illustrated in FIG. 14, the circuit resistance $R_L$ increases in response to temperature rise.

When the respective parameters are adjusted considering the temperature characteristics of the respective elements of the magnetic flux sensor 301, the magnetic flux sensor 301 can be adjusted to reduce fluctuations in oscillation frequency caused by temperature fluctuations, or the temperature characteristics of the magnetic flux sensor 301 can be made similar to those of the crystal-oscillator circuit 60 described with reference to FIG. 11.

The inventors of the present application, however, recognize that adjusting the parameters "L", "C", and "$R_L$" included in Formula 1 independently is difficult since those parameters have predetermined correlations on the premise that the magnetic permeability detecting capability is established. Specifically, the circuit resistance $R_L$ is affected by the length of the conducting wire that changes in accordance with the number of coil winding of the planar coil 302, the inductance L of the planar coil 302 is determined by the number of coil winding, and the number of coil winding affects the sensing capability of the magnetic flux sensor.

In view of the foregoing, in the present embodiment, the magnetic flux sensor 301 further includes the adjusting resistor 304 that does not affect the inductance L of the planar coil 302, and the circuit resistance $R_L$ is adjustable by adding a resistance value $R_P$ of the adjusting resistor 304. With the adjusting resistor 304, the circuit resistance $R_L$ is adjustable independently not to affect the inductance L of the coil, and thus the temperature characteristics can be adjusted without affecting the sensing capability of the magnetic flux sensor 301.

The adjusting resistor 304 is provided in series with the planar coil 302 and parallel to the first and second capacitors 305 and 306 so that the resonance current loop is established in the Colpitts-type LC oscillator circuit of the magnetic flux sensor 301 by the adjusting resistor 304 together with the planar coil 302 and the first and second capacitors 305 and 306.

In the present embodiment, the magnetic flux sensor 301 includes the adjusting resistor 304 that is a planar resistor made of conducting wire printed on the board, similar to the planar coil 302. Although various shapes such as linear and curved line shapes are possible for the adjusting resistor 304, conducting wire having a reasonable length is required for the capability of resistor, thus making the sensor bulkier.

In practice, conducting wire having a length required for the capability of resistor is disposed inside a limited area of the board except the range where the planar coil 302 is present. In view of the foregoing, in the present embodiment, the adjusting resistor 304 is made of conducting wire bent multiple times to reciprocate in the predetermined direction from one side to the opposite side on the board.

Figure 22A:
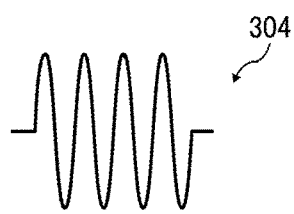
FIGS. 22A through 22D illustrate shapes of a resistor according to another embodiment.
Figure 22B:
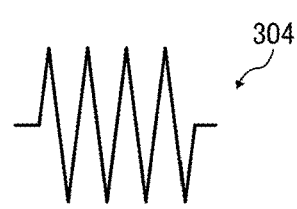
Figure 22C:
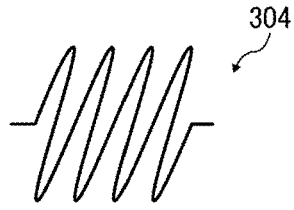
Figure 22D:
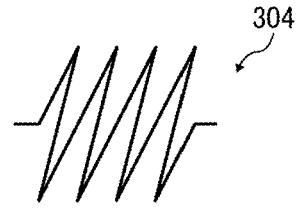

More specifically, the adjusting resistor 304 can be made of straight lines and right angles as illustrated in FIGS. 17A through 17D, sine curves as illustrated in FIG. 22A, or straight lines and acute angles as illustrated in FIG. 22B. Alternatively, as illustrated in FIGS. 22C and 22D, peaks and valleys in the shapes illustrated in FIGS. 22A and 22B may be inclined. In the descriptions below, the term "zigzag" means the above-described shape in which the straight or curved lines are bent and folded back, like a serpentine, multiple times to reciprocate in the predetermined direction.

For example, the planar coil 302 and the adjusting resistor 304 are produced in the following manner. Initially, plate front and back sides of a glass epoxy substrate, serving as a printed wiring board, with copper foil in a predetermined thickness. Examples of the glass epoxy substrate include Flame retardant-4 (FR-4) and Composite epoxy material-3 (CEM-3). Coat the plated board with dry film that hardens with light, thus forming two layers different in material on the front and back sides of the glass epoxy board. Subsequently, put, from above the dry film, a mask pattern film in which a circuit pattern is laid in close contact with the coated substrate, and enhance the contact therebetween by vacuum suction, thereby fixing the mask pattern film thereto.

Expose the substrate to a predetermined amount of light having a predetermined wavelength for a predetermined time. Then, the dry film does not harden in portions covered with the mask pattern film and light is blocked. By contrast, the dry film hardens in portions exposed to light. In this state, subject the substrate in an etching liquid. Then, the masked portion, that is, the portion where the dry film does not harden, dissolves in the etching liquid. Simultaneously, the copper foil under it dissolves as well and is lost. In the exposed portion, which is not masked, the dry film does not dissolve in the etching liquid owing to hardening and remains, and the copper foil under it remains as well.

Subsequently, remove the dry film. Then, only the copper foil remains on the substrate in a minute pattern with a width of about 100 μm. As required, apply resist coat liquid entirely in a constant thickness and let the coat harden with heat to prevent pattern loss by oxidization or damage to the substrate. Thus, the planar coil 302 and the adjusting resistor 304 are printed on the printed wiring board.

Incidentally, in a case where the planar coil 302 is printed on the back side of the substrate whereas the adjusting resistor 304 is printed on the front side of the substrate, in production of the printed wiring board, the front and back sides of the substrate is exposed to different types of etching liquid via the substrate. That is, the concentration of the etching liquid for the front side and that for the back side are different from a partial standpoint although the substrate is etched in a large vessel from a macro standpoint. Consequently, differences are caused in the etching conditions. Therefore, there is the possibility that the remaining dry film slightly differs in width (width of copper foil pattern) between the front side and the back side, and the temperature characteristics of the oscillation frequency f of the magnetic flux sensor 301 deviates from the target.

To avoid such factors to cause manufacturing variations, in the magnetic flux sensor 301 according to the present embodiment, the planar coil 302 and the adjusting resistor 304 are printed on an identical board face (the front face 3011 in FIG. 6A) of the printed wiring board. It is to be noted that, as described above, the electronic elements such as the first and second capacitors 305 and 306 are preferably provided to the face of the printed wiring board on the opposite side of the planar coil 302 and the adjusting resistor 304 to secure proper location of the planar coil 302 relative to the detected object.

Additionally, according to the present embodiment, the oscillation frequency f of the LC oscillator circuit, considering the resistance value $R_P$ of the adjusting resistor 304, can be expressed by Formula 2 below.

$$f_1 = \frac{1}{2\pi} \cdot \sqrt{\frac{1}{LC} - \left(\frac{R_L + R_P}{2L}\right)^2} \qquad (2)$$

The resistance $R_p$ can be adjusted independently although it is difficult to adjust the parameters "$R_L$", "L", and "C" as described above. As described above with reference to FIG. 14, since the resistance generally changes proportionally to temperature change, the resistance value $R_p$ of the adjusting resistor 304 reduces the oscillation frequency f in response to temperature rise.

Next, descriptions are given below of a configuration to adjust the resistance value $R_p$ by the adjusting resistor 304, which is a planer resistor, without affecting the inductance L of the planar coil 302 with reference to FIGS. 15 and 16.

Figure 15:
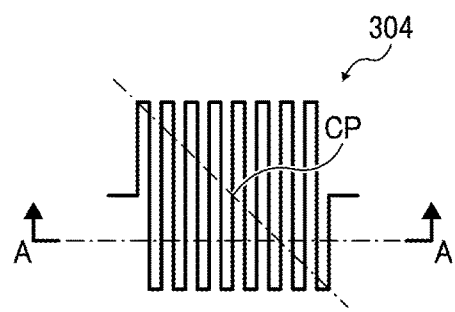
FIG. 15 illustrates a shape of a resistor according to an embodiment.
Figure 16:
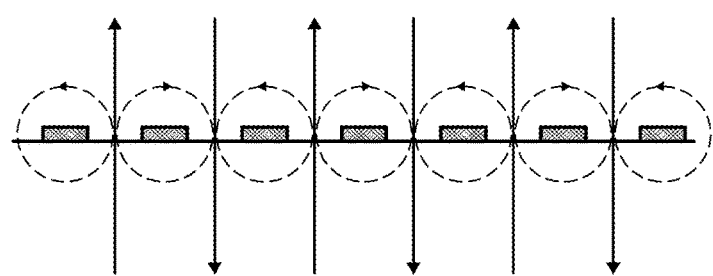
FIG. 16 is a cross-sectional view along line A-A in FIG. 15, to illustrate a magnetic flux generated in the resister illustrated in FIG. 15.
Figure 17A:
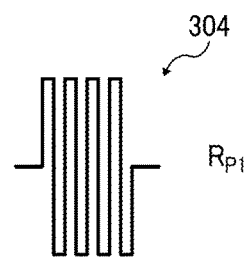
FIGS. 17A through 17D illustrate shapes of a resistor according to an embodiment.
Figure 17B:
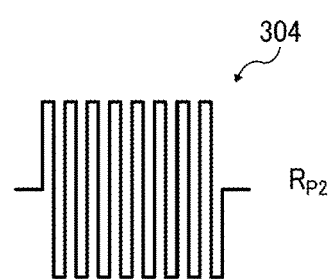
Figure 17C:
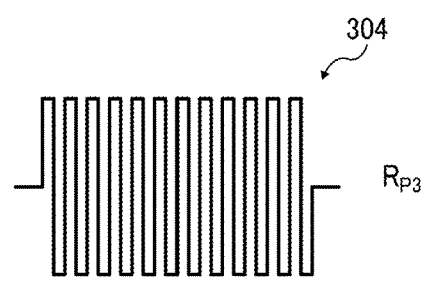
Figure 17D:
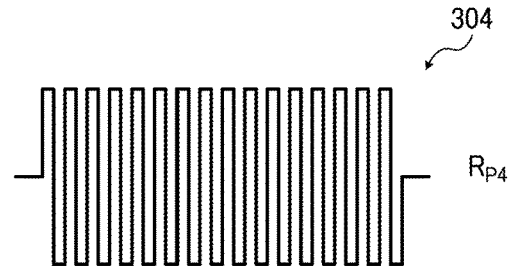

FIG. 15 illustrates a shape of the adjusting resistor 304, and FIG. 16 is a cross-sectional view along line A-A in FIG. 15.

As illustrated in FIG. 16, as the current flows through the adjusting resistor 304, magnetic fluxes are generated around the conducting wire as indicated by broken lines in the drawing according to the right hand rule regarding ampere. Since the magnetic flux increases in strength between the adjacent patterns (adjacent segments of the bent wire), between the adjacent patterns, a magnetic flux is in a direction perpendicular to the face on which the zigzag pattern is printed, as indicated by a solid line in FIG. 16.

However, as illustrated in FIG. 16, the direction of magnetic flux generated between an initial pair of adjacent wire portions is the opposite to the direction of magnetic flux generated between a subsequent pair of adjacent wire portions, and the direction alternate sequentially. Accordingly, the magnetic fluxes in the opposite directions cancel each other. Therefore, in the entire zigzag adjusting resistor 304, the magnetic flux perpendicular to the face bearing the resistance pattern is canceled.

The direction perpendicular to the face bearing the resistance pattern is identical to the direction of magnetic flux of the planar coil 302. Thus, practically, the zigzag adjusting resistor 304 does not generate magnetic fluxes in the direction in which the magnetic flux of the planar coil 302 is generated. Therefore, it can be deemed that the zigzag adjusting resistor 304 is not affected by the ambient magnetic flux and the resistance value $R_P$ that does not have the capability to sense the magnetic flux. In other words, this is a resistance value that does not affect the inductance L of the planar coil 302.

It is to be noted that, when the zigzag shape of the adjusting resistor 304 is symmetrical relative to a point so that the number of folding back from one side and that from the other side are identical, the magnetic fluxes in the opposite directions can coincide with each other. More specifically, as illustrated in FIG. 15, the adjusting resistor 304 has a zigzag shape symmetric with respect to a center point CP of a line connecting together one end and the other end of the adjusting resistor 304 connected to the LC oscillator circuit. The adjusting resistor 304 can be zigzag in various manner as illustrated in FIGS. 17A through 17D and 22A through 22D. As described with reference to FIGS. 15 and 16, the pattern in which the adjacent segments of bent conducting wire are parallel to each other is advantageous in canceling the magnetic fluxes.

It is to be noted that, the magnetic flux sensor 301 according to the present embodiment further includes a test wiring pattern printed on a back face of the printed wiring board opposite the front face 3011 on which the adjusting resistor 304 is printed. The test wiring pattern is identical or similar in shape with the adjusting resistor 304. The resistance value $R_p$ of the adjusting resistor 304 is determined by measuring the resistance value of the test wiring pattern because measuring directly the resistance value of the adjusting resistor 304 may result in damage to the adjusting resistor 304 constituted of minute printed wire, the planar coil 302 in the same board face of the magnetic flux sensor 301 as the adjusting resistor 304, or both.

Adjustment of the resistance value $R_p$ of the adjusting resistor 304 is described below. FIGS. 17A, 17B, 17C, and 17D illustrate shapes of the adjusting resistor 304 respectively corresponding to $R_{P1}$ through $R_{P4}$ in the relation of $R_{P1}<R_{P2}<R_{P3}<R_{P4}$. Referring to FIGS. 17A through 17D, the resistance value $R_P$ is increased by increasing the number of zigzag folding (the number of reciprocation from one side to the other side and vice versa) in the zigzag adjusting resistor 304.

In other words, the resistance value $R_P$ added to the circuit resistance $R_L$ is increased by increasing the number of zigzag folding, and thus the peak temperature (extreme value) at which the oscillation frequency f of the magnetic flux sensor 301 peaks can be lowered without affecting the inductance L of the planar coil 302.

Thus, temperature characteristics of the oscillation frequency of the magnetic flux sensor 301 can be made similar preliminarily obtained temperature characteristics of the oscillation frequency of the crystal-oscillator circuit 60.

With the magnetic flux sensor 301 thus configured, even when the oscillation frequency of the crystal-oscillator circuit 60 fluctuates due to temperature changes, errors or differences in the oscillation frequency of the magnetic flux sensor 301 calculated in the engine controller 31 is reduced since the oscillation frequency of the magnetic flux sensor 301 fluctuates similarly.

Accordingly, this configuration is advantageous in enhancing accuracy in detecting the magnetic flux (density of magnetic material) inside the range of action of the magnetic flux of the magnetic flux sensor 301 (in the space opposed to the front face 3011 bearing the planar coil 302).

When the oscillation frequency of the crystal-oscillator circuit 60 was measured with ambient temperature (temperature of environment under which the magnetic flux sensor 301 was used) set to a range from 10° C. to 50° C., the fluctuations were ±10 to 40 part per million (ppm). When the resistance value $R_P$ of the adjusting resistor 304 was adjusted experimentally to cause the peak temperature on the parabola-like temperature characteristics of the magnetic flux sensor 301 to coincide with the peak temperature on the parabola-like temperature characteristics (illustrated in FIG. 11) of the crystal-oscillator circuit 60, they substantially coincided with each other at a resistance value of 0.3Ω.

In the temperature range of 10° C. to 50° C., the oscillation frequency of the magnetic flux sensor 301 thus produced fluctuated ±37 ppm and generally coincided with the fluctuation range of frequency of the crystal-oscillator circuit 60, which was ±10 to 40 ppm.

As described above, in the magnetic flux sensor 301 according to the present embodiment, by providing the adjusting resistor 304 serving as the resistance adjusting portion, connected in series to the planar coil 302 serving as a detecting portion, in the resonance current loop of the Colpitts-type LC oscillator circuit, the temperature characteristics of the oscillation frequency can be adjusted to coincide with the temperature characteristics of the oscillator circuit that outputs the reference clock.

A principle of sheet size recognition by the main controller 30 according to the present embodiment is described below.

FIGS. 18A and 18B are graphs of oscillation frequency of the magnetic flux sensor 301 corresponding to the position of the side fence 292 illustrated in FIGS. 4A and 4B or 5A and 5B. In FIG. 18A, the oscillation frequency increases as the side fence 292 moves from the position shown in FIG. 4A (i.e., outer side in the direction D1 to the position shown in FIG. 4B (i.e., inner side in the direction D1). This behavior occurs when the target 303 is magnetic.

By contrast, in FIG. 18B, the oscillation frequency decreases as the side fence 292 moves from the outer side in the direction D1 in FIG. 4A to the inner side in the direction D1 in FIG. 4B. This behavior occurs when the target 303 is nonmagnetic as well as conductive.

FIG. 19 is an example of a table (hereinafter "sheet size table") in which sheet size is correlated with the frequency of signal output from the magnetic flux sensor 301, acquired by the main controller 30 via the engine controller 31.

In the sheet size table in FIG. 19, "sheet size" is correlated with a combination of "oscillation frequency" and "length detection".

"Oscillation frequency" means the frequency of signal output from the magnetic flux sensor 301 according to the position of the side fence 292, and "oscillation frequency" is acquired by the engine controller 31 and input to the main controller 30. "Oscillation frequency" in the sheet size table in FIG. 19 is represented by frequency ranges such as "f1 to f2". In the sheet size table, the main controller 30 identifies the frequency range in which the frequency acquired from the engine controller 31 falls.

"Length detection" in the sheet size table in FIG. 19 means data that indicates a detection state of sheet length sensors detecting sheet size in the bypass tray 29 in the direction of conveyance of sheet, which is vertical direction in FIG. 4A. In other words, "length detection" means detection results of sheet length in a sheet conveyance direction perpendicular to the sheet width (in the direction D1 in FIG. 4A) detected by the detecting portion 300.

The bypass tray 29 according to the present embodiment includes one or more sheet length sensors to detect whether the sheet is present at predetermined positions in the sheet conveyance direction. For example, optical sensors are used. The sheet length sensor can also serve as the sheet sensor to detect whether or not a sheet is set on the bypass tray 29, according to which start of rotation of the driving pinion gear 293 is determined.

The multiple sheet length sensors are provided to the bypass tray 29 and disposed at the predetermined positions in the sheet conveyance direction (i.e., sheet length direction), and the engine controller 31 acquires a detection result from each of the multiple sheet length sensors. The detection state of each sheet length sensor depends on the sheet length. In the case of larger sheet size, many of the sheet length sensors detect the sheet. In the case of smaller sheet size, many of the sheet length sensors do not detect the sheet.

In the bypass tray 29 according to the present embodiment, three sheet length sensors are disposed at different positions in the sheet conveyance direction. The detection state of each of the three sheet length sensors is represented by "0" or "1", and the engine controller 31 acquires a three-digit number, such as "000" and "100" in FIG. 19, and inputs three-digit number as a length detection result to the main controller 30. The main controller 30 refers to the three-digit number in FIG. 19, indicating the length detection state, and recognizes sheet size correlated with the combination of the input length detection state and the identified oscillation frequency range. Thus, the main controller 30 recognizes the sheet size.

If the oscillation frequency of the magnetic flux sensor 301 changes linearly corresponding to the position of the side fence 292 as illustrated in FIGS. 18A and 18B, the main controller 30 recognizes the size of sheets set on the bypass tray 29 with a high degree of accuracy through simple processing as described with reference to FIG. 19. Accordingly, it is advantageous that the oscillation frequency of the magnetic flux sensor 301 changes linearly corresponding to the position of the side fence 292.

Changes in frequency, however, are affected by various factors such as the circuit configuration illustrated in FIG. 8, the relative positions of the planar coil 302 and the target 303 described with reference to FIGS. 6A and 6B, and the like. In view of the foregoing, descriptions are given below of adjustment in configuration of the target 303 to adjust changes in oscillation frequency of the magnetic flux sensor 301 corresponding to the position of the side fence 292 so that the oscillation frequency changes linearly.

Figure 20:
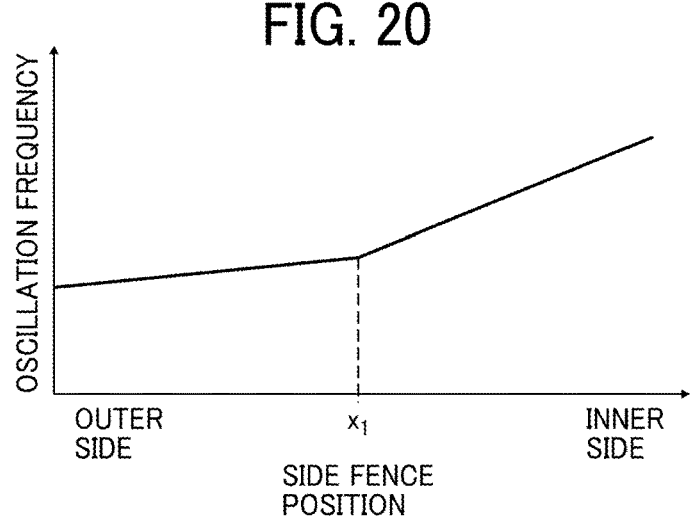
FIG. 20 is a graph of changes in oscillation frequency of a magnetic flux sensor corresponding to positions of a side fence according to an embodiment.

FIG. 20 is a graph of oscillation frequency of the magnetic flux sensor 301 corresponding to the position of the side fence 292 similar to FIG. 18A, for a case where width change of the target 303 in the direction D1, in which the rack 296 moves, is regular as illustrated in FIGS. 6A and 6B.

In FIG. 20, when the side fence 292 passes by a position $X_1$ in the bypass tray 29, an inclination of changes in oscillation frequency corresponding to the position of the side fence 292 changes, thus disturbing its linearity.

Figure 21:
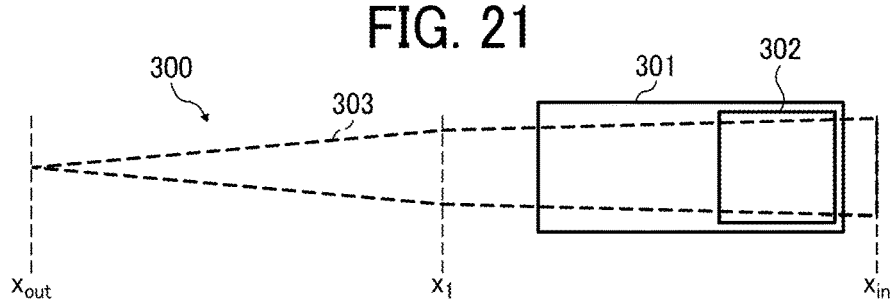
FIG. 21 is a view illustrating a shape of a target according to an embodiment.

FIG. 21 is a shape of the target 303 in which linearity irregularities in FIG. 20 are reflected.

As illustrated in FIG. 21, tendency of width change of the target 303 in the direction D1, in which the rack 296 moves, is changed at a position corresponding to the position $X_1$ of the side fence 292. Specifically, as illustrated in FIG. 20, the frequency change corresponding to the position of the side fence 292 is milder in a range corresponding to a range from an outer position $X_{out}$ to the position X1 of the bypass tray 29. To sharpen the frequency change corresponding to the position of the side fence 292 in that range, the width change of the target 303 in the direction D1 is made sharper to sharpen the frequency change corresponding to the position of the side fence 292.

By contrast, as illustrated in FIG. 20, the frequency change corresponding to the position of the side fence 292 is sharper in a range from an inner position $X_{in}$ to the position X1 of the bypass tray 29. In that range, the width change of the target 303 in the direction D1 is made milder to moderate the frequency change corresponding to the position of the side fence 292, differently from the range from the outer position $X_{out}$ to the position X1.

It is to be noted that the point where tendency of width change of the target 303 changes is not limited to that illustrated in FIG. 21 (once at the position $X_1$). Alternatively, tendency of width change of the target 303 is changed at multiple points in accordance with the linearity irregularities of the oscillation frequency corresponding to the position of the side fence 292 as described with reference to FIG. 20.

Thus, according to the detecting portion 300 of the present embodiment, changes in oscillation frequency of the magnetic flux sensor 301 corresponding to changes in position of the movable member, such as the side fence 292 or the rack 296, that moves to detect sheet size are easily adjustable by simply changing the shape or arrangement of the target 303. Accordingly, a contactless sheet size detector with a high degree of accuracy is attained.

Additionally, according to the present embodiment, the detecting portion 300 uses the planar coil 302 and the planar target 303, which is advantageous in reducing design limitations in the direction perpendicular to the sheet mounting face as illustrated in FIG. 6C, thereby making the bypass tray 29 compact. As described above, the present embodiment is advantageous in making a compact sheet size detector according to the position of the movable member and increasing the detection accuracy.

It is to be noted that, although the serpentine pattern of the adjusting resistor 304 include straight lines and right angles only in the descriptions above, the serpentine pattern is not limited thereto. For example, a serpentine pattern including curved lines illustrated in FIG. 22A and straight lines and acute angles as illustrated in FIG. 22B are possible. Alternatively, as illustrated in FIGS. 22C and 22D, peaks in the shapes illustrated in FIGS. 22A and 22B may be inclined.

Additionally, although the description above concerns the target 303 shaped such that the width (length in the direction perpendicular to the direction D1) thereof changes in the direction D1 in which the rack 296 moves as illustrated in FIGS. 6A and 6B, the configuration of the target 303 is not limited thereto as long as the magnetic flux of the planar coil 302 provided to the magnetic flux sensor 301 changes as the rack 296 moves. Other configurations of the target 303 are described below.

Figure 23A:
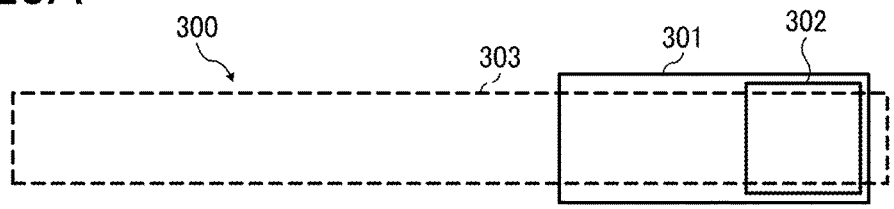
FIGS. 23A, 23B, and 23C illustrate a sheet size detector according to an embodiment.
Figure 23B:
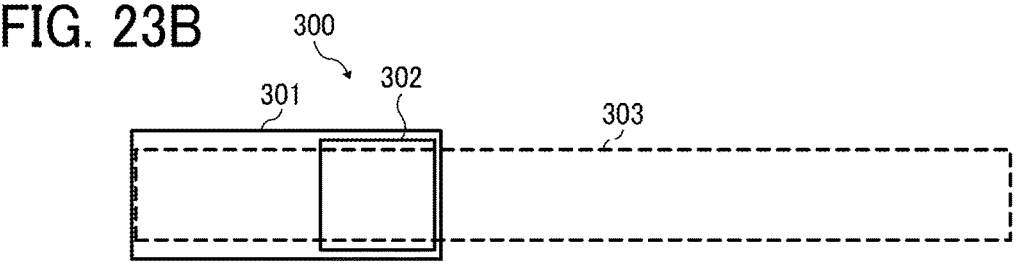
Figure 23C:
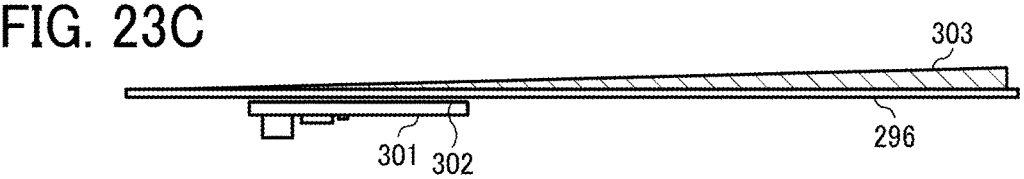

In the configuration illustrated in FIGS. 23A, 23B, and 23C, as the rack 296 moves, the target 303 changes in thickness, thereby changing the magnetic flux of the planar coil 302. As the thickness of the target 303, through which the magnetic flux passes through, increases, the effect of the target 303 on the magnetic flux of the planar coil 302 increases.

Accordingly, the configuration illustrated in FIGS. 23A through 23C attains effects similar to those described above. Additionally, in the configuration illustrated in FIGS. 23A through 23C, the frequency change corresponding to the position of the side fence 292 is adjustable by the shape of the target 303 as described with reference to FIGS. 20 and 21.

Figure 24A:
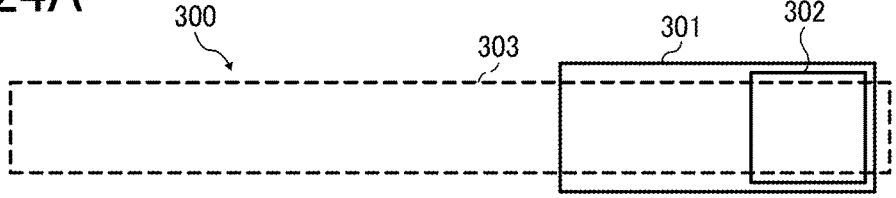
FIGS. 24A, 24B, and 24C illustrate a sheet size detector according to an embodiment.
Figure 24B:
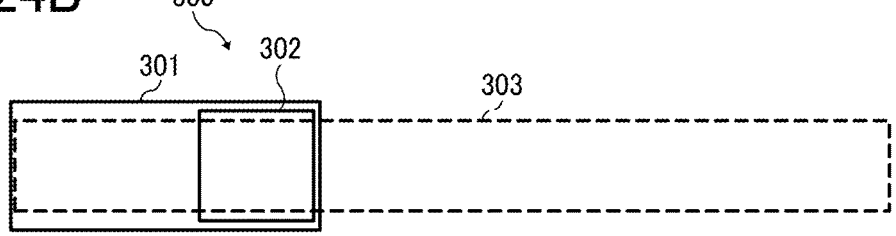
Figure 24C:
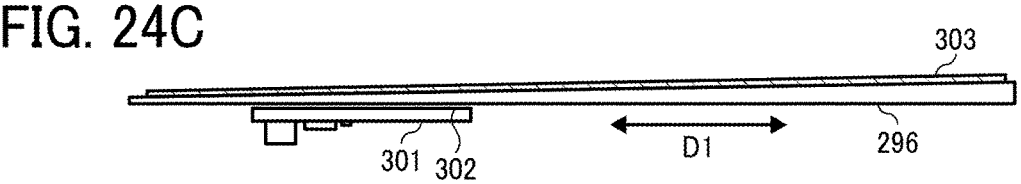

In the configuration illustrated in FIGS. 24A, 24B, and 24C, a thickness (length in the direction perpendicular to the direction D1) of the rack 296 is different in the direction D1. Accordingly, as the rack 296 moves, a distance between the planar coil 302 and the target 303 changes, thereby changing the magnetic flux of the planar coil 302. The effect of the target 303 on the magnetic flux of the planar coil 302 increases as the distance from the planar coil 302 to the target 303 decreases, that is, the target 303 is situated at a position where the magnetic flux is stronger.

Accordingly, the configuration illustrated in FIGS. 24A through 24C attains effects similar to those described above. Additionally, in the configuration illustrated in FIGS. 24A through 24C, the frequency change corresponding to the position of the side fence 292 is adjustable by the shape of the target 303 as described with reference to FIGS. 20 and 21.

Figure 25A:
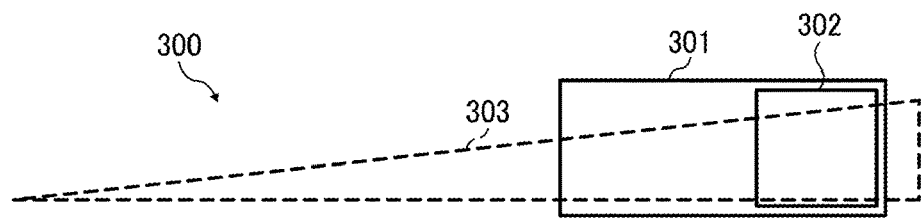
FIGS. 25A, 25B, and 25C illustrate a sheet size detector according to an embodiment.
Figure 25B:
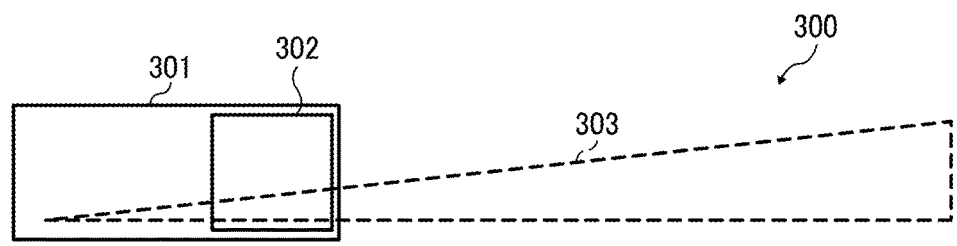
Figure 25C:
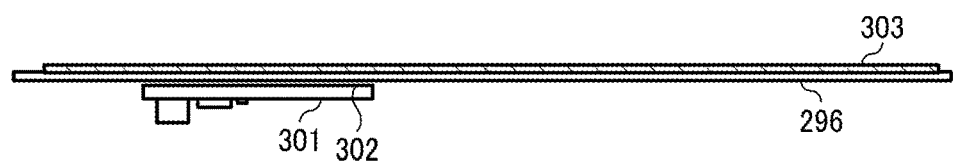

In the configuration illustrated in FIGS. 25A, 25B, and 25C, the target 303 is not an isosceles triangle as in FIG. 6A but is a right triangle although the target 303 opposed to the planar coil 302 changes in area as the rack 296 moves similar to the configuration illustrated in FIGS. 6A through 6C. The configuration illustrated in FIGS. 25A through 25C attains effects similar to those attained by the configuration illustrated in FIGS. 6A through 6C.

Figure 26:
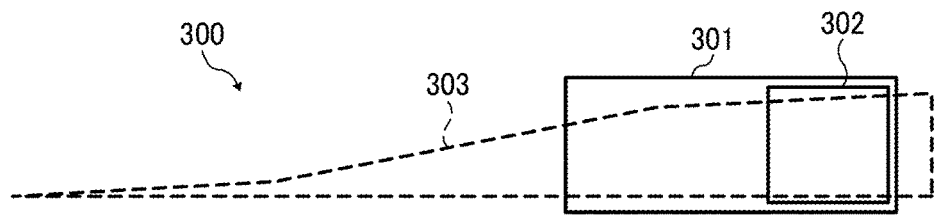
FIG. 26 is a view illustrating a shape of a target according to an embodiment.

Additionally, in the configuration illustrated in FIGS. 25A through 25C, the frequency change corresponding to the position of the side fence 292 is adjustable by the shape of the target 303 as described with reference to FIGS. 20 and 21. In this case, the shape of the target 303 is adjusted as illustrated in FIG. 26. Specifically, the isosceles triangle of the target 303 is different in height depending on the position in the direction D1 in which the rack 296 moves. It is relatively easy to adjust the shape to conform to the shape of the graph illustrated in FIG. 20.

Figure 27A:
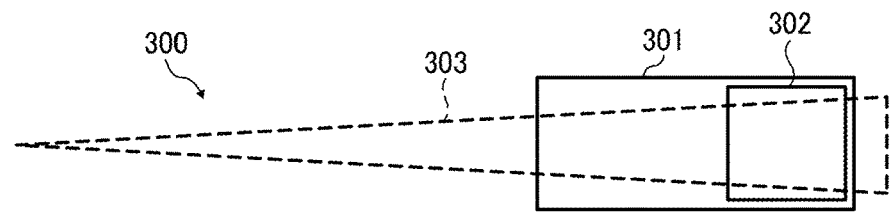
FIGS. 27A, 27B, and 27C illustrate a sheet size detector according to an embodiment.
Figure 27B:
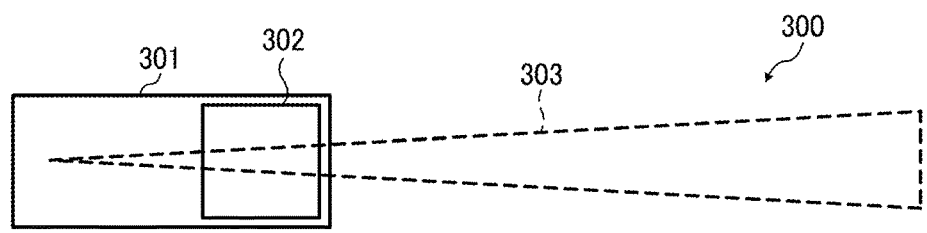
Figure 27C:
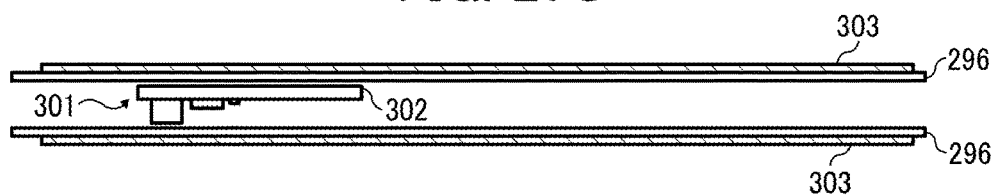

In the configuration illustrated in FIGS. 27A, 27B, and 27C, the target 303 is disposed on either side of the magnetic flux sensor 301 although this is a variation of the configuration in which the target 303 opposed to the planar coil 302 changes in area as the rack 296 moves similar to the configuration illustrated in FIGS. 6A through 6C. Specifically, the detecting portion 300 in FIG. 27C includes two targets 303 to interpose the magnetic flux sensor 301 therebetween in the direction perpendicular to the sheet mounting face of the bypass tray 29. In the configuration illustrated in FIGS. 27A through 27C, compared with the configuration illustrated in FIGS. 6A through 6C, changes in magnetic flux in response to movement of the rack 296 are sharper. As a result, changes in oscillation frequency in response to movement of the rack 296 are made sharper.

It is to be noted that the above-described various features of the target 303, that is, the shape, the thickness, the distance of the target 303 from the planar coil 302, arrangement (e.g., one side of both sides of the magnetic flux sensor 301), can be combined, thus widening the adjustable range of frequency change corresponding to the position of the side fence 292.

Additionally, in the above-described embodiment, the target 303 is disposed on the side of the rack 296, and the magnetic flux sensor 301 is secured to the body of the bypass tray 29. Since wire is connected to the magnetic flux sensor 301, the stationary magnetic flux sensor 301 is advantageous in facilitating wiring. However, component arrangement is not limited to the above-described arrangement. Alternatively, the magnetic flux sensor 301 is disposed on the side of the rack 296 in another embodiment.

Second Embodiment

In the above-described first embodiment, in a range of movement of the rack 296 (shown in FIG. 6C), the target 303 extends entirely in an range to which the planar coil 302 is opposed, and the output frequency of the magnetic flux sensor 301 changes gradually as the rack 296 moves. In a second embodiment described below, the target 303 is provided intermittently in the range to which the planar coil 302 is to oppose in the range of movement of the rack 296, and sheet size is detected according to results of detection thereof.

Figure 28A:
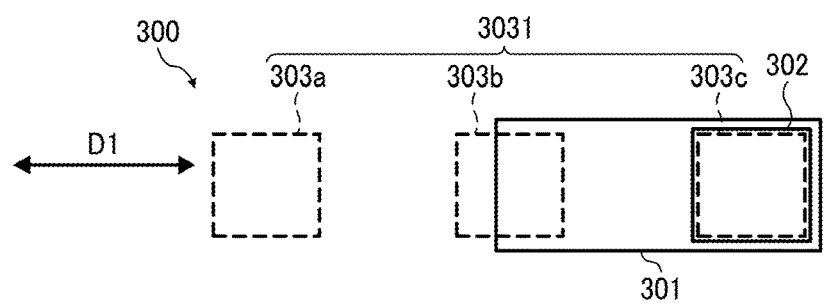
FIGS. 28A and 28B illustrate a sheet size detector according to an embodiment.
Figure 28B:
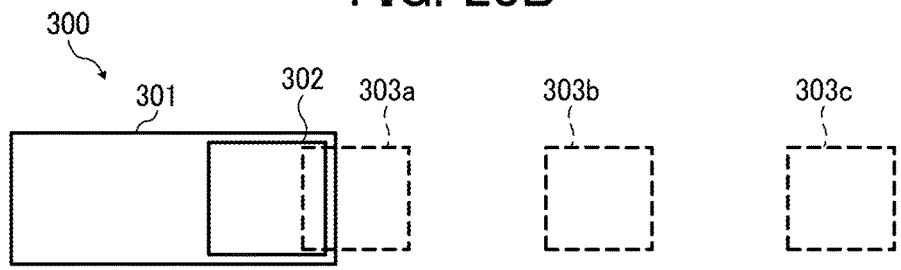

FIGS. 28A and 28B are schematic views of relative positions of a target 3031 and the magnetic flux sensor 301 in the detecting portion 300 according to the second embodiment and correspond to FIGS. 6A and 6B.

The target 3031 illustrated in FIGS. 28A and 28B is disposed intermittently in the range to which the planar coil 302 is to oppose as the rack 296 (shown in FIG. 6C) moves. Specifically, the target 3031 includes target pieces 303a, 303b, and 303c arranged in the direction D1 in which the rack 296 moves.

With this configuration, as illustrated in FIGS. 28A and 28B, a state in which the planar coil 302 is opposed to the target 3031 alternates with a state in which the planar coil 302 is not opposed to the target 3031 as the rack 296 moves. In this case, the output frequency of the magnetic flux sensor 301 is, for example, as illustrated in FIG. 29.

Figures 29, 30:
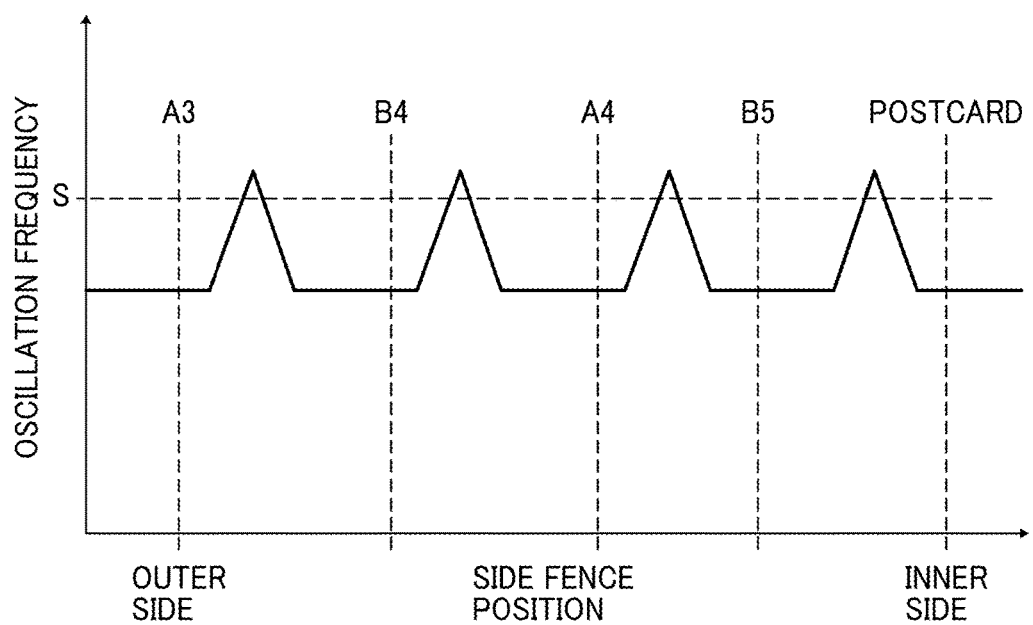
FIG. 29 is a graph of changes in oscillation frequency of a magnetic flux sensor corresponding to positions of a side fence according to an embodiment.
FIG. 30 is a table in which sheet size is correlated with data for sheet size determination according to an embodiment.

FIG. 29 is a graph of oscillation frequency of the magnetic flux sensor 301 corresponding to the position of the side fence 292. In FIG. 29, the oscillation frequency rises when the planar coil 302 is opposed to the target 3031.

Referring to FIG. 29, when the planar coil 302 is situated at respective positions of the target pieces 303a, 303b, and 303c illustrated in FIG. 28, the oscillation frequency rises to a peak. The main controller 30 compares the oscillation frequency with a threshold S in FIG. 29, thereby detecting the planar coil 302 being opposed to the target 3031.

The abscissa in FIG. 29 represents the position of the side fence 292 and corresponds to sheet sizes such as A3, B4, A4, B5, and postcard. For example, as illustrated in FIG. 29, the target pieces 303a, 303b, and 303c are disposed between the positions corresponding to the respective sheet sizes. Then, sheet size of sheets set on the bypass tray 29 is determined simply by the number of times peak of oscillation frequency is detected while the rack 296 moves from the position illustrated in FIG. 4A.

FIG. 30 is a sheet size table referred to by the main controller 30 for the above-described simple detection of sheet size.

In the sheet size table according to the present embodiment, referring to FIG. 30, "sheet size" is correlated with a combination of "number of peak detection" and "length detection". As described above, the number of times the peak of oscillation frequency of the magnetic flux sensor 301 is detected is counted based on the threshold S, and the main controller 30 determines sheet size of sheets set on the bypass tray 29 based on the correlation with the count and the length detection stored in the sheet size table, such as the one illustrated in FIG. 30.

Third Embodiment

In the first and second embodiments described above, a pattern coil printed on the substrate is used. The planar coil (i.e., in a planar pattern of wire) is advantageous in reducing the size of the bypass tray 29 in the direction perpendicular to the sheet mounting face, thereby making the apparatus compact.

However, similar effects are available with a coil configured to generate a magnetic flux perpendicular to the sheet mounting face even if the coil is not shaped in a planar pattern. A coil requires a looped path through which electric current flows and thus occupies a space to accommodate the loop.

If the coil is configured to generate a magnetic flux parallel to the sheet mounting face, the size of the loop is required in the direction perpendicular to the sheet mounting face. By contrast, when the coil is configured to generate the magnetic flux perpendicular to the sheet mounting face, the size of the loop is required in the direction parallel to the sheet mounting face. Accordingly, the size in the direction perpendicular to the sheet mounting face is reduced.

Figure 31A:
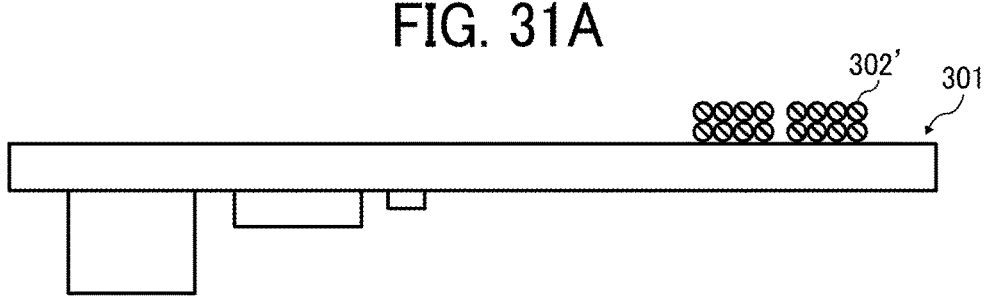
FIGS. 31A and 31B illustrate a shape of a coil according to another embodiment.
Figure 31B:
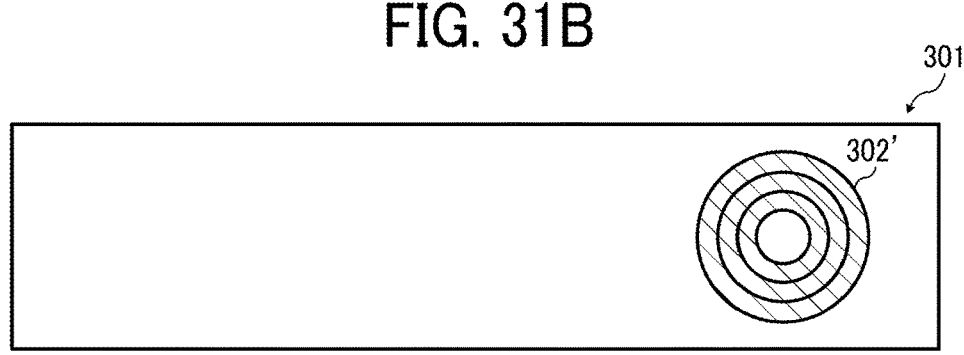

FIGS. 31A and 31B illustrate a configuration of a coil to generate the magnetic flux perpendicular to the sheet mounting face except the configuration in which the coil is planar.

FIG. 31A is a side view of the magnetic flux sensor 301 as viewed in a direction parallel to the face of the board serving as the magnetic flux sensor 301. FIG. 31B is a view of the magnetic flux sensor 301 as viewed in a direction perpendicular to the face of the board serving as the magnetic flux sensor 301. The configuration illustrated in FIGS. 31A and 31B includes a coil 302' produced by winding wire on the board serving as the magnetic flux sensor 301. A surface of the coil is insulated. In the configuration illustrated in FIGS. 31A and 31B as well, the detecting portion 300 and the thickness of the bypass tray 29 can be smaller in thickness, which is the size in the direction perpendicular to the sheet mounting face. Accordingly, the apparatus can be compact.

Fourth Embodiment

In the above-described embodiments, the target 303 is uniform in material. By contrast, in a fourth embodiment described below, to clearly detect passage of a point in the direction D1 as described above with reference to FIGS. 28A and 28B, the material of the target 303 is changed at that point.

Figure 32A:
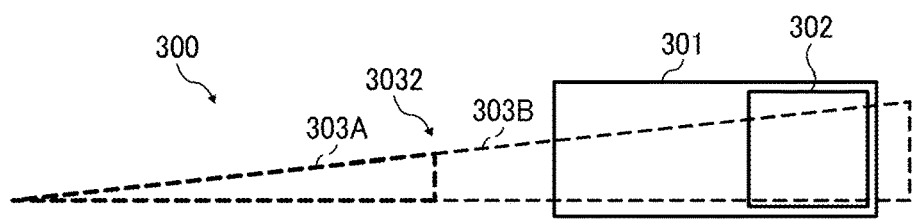
FIGS. 32A and 32B illustrate a sheet size detector according to another embodiment.
Figure 32B:
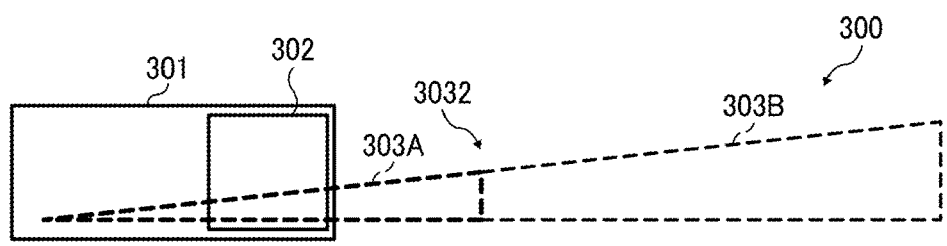

FIGS. 32A and 32B are schematic views of relative positions of a target 3032 and the magnetic flux sensor 301 in the detecting portion 300 according to the present embodiment and correspond to FIGS. 6A and 6B. As illustrated in FIGS. 32A and 32B, the target 3032 according to the present embodiment includes portions 303A and 303B different in conductivity from each other.

Figure 33:
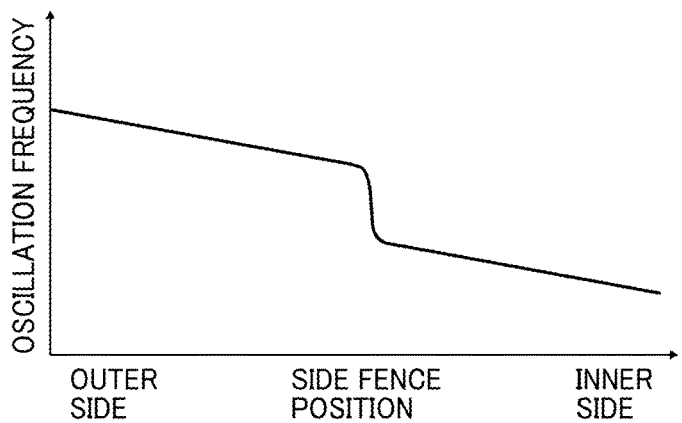
FIG. 33 is a graph of changes in oscillation frequency of a magnetic flux sensor corresponding to positions of a side fence according to an embodiment.

FIG. 33 is a graph of oscillation frequency of the magnetic flux sensor 301 corresponding to the position of the side fence 292 in the configuration illustrated in FIGS. 32A and 32B.

Since the portions 303A and 303B in FIG. 33 are made of nonmagnetic, conductive materials, basically changes in oscillation frequency follow the graph of FIG. 18B. Further, as illustrated in FIG. 33, the oscillation frequency changes significantly when the side fence 292 is situated such that a border between the portion 303A and the portion 303B coincides with the position opposed to the planar coil 302, as the side fence 292 moves.

According to the fourth embodiment, by disposing the border between the portion 303A and the portion 303B to conform to the position at which accurate detection of minute position changes of the side fence 292 is preferred, the oscillation frequency can be changed significantly at such a position. Accordingly, minute position changes of the side fence 292 can be detected with a higher degree of accuracy.

It is to be noted that the fourth embodiment concerns the nonmagnetic, conductive target 3032 including portions different in conductivity from each other. However, similar effects are available by other configurations to cause a significant change in the oscillation frequency when the border between portions different in material passes by the position opposed to the planar coil 302. For example, in one embodiment, the target 3032 is nonmagnetic and includes the portions 303A and 303B different in magnetic permeability.

Fifth Embodiment

In the configuration illustrated in FIGS. 24A, 24B, and 24C, magnetic flux change of the planar coil 302 is caused by changing the distance between the planar coil 302 and the target 303 is described. By contrast, in the case illustrated n FIGS. 6A through 6C, in which the oscillation frequency of the magnetic flux sensor 301 is changed by changing the area of the target 303, the distance between the planar coil 302 and the target 303 is fixed.

In other words, in configurations using changes in area of the target 303, there is a risk that the oscillation frequency of the magnetic flux sensor 301 does not change as expected if the distance between the planar coil 302 and the target 303 fluctuates in an unintended manner. Constituently, the position of the side fence 292 is not accurately detected, and sheet size is not accurately detected.

Figure 34:
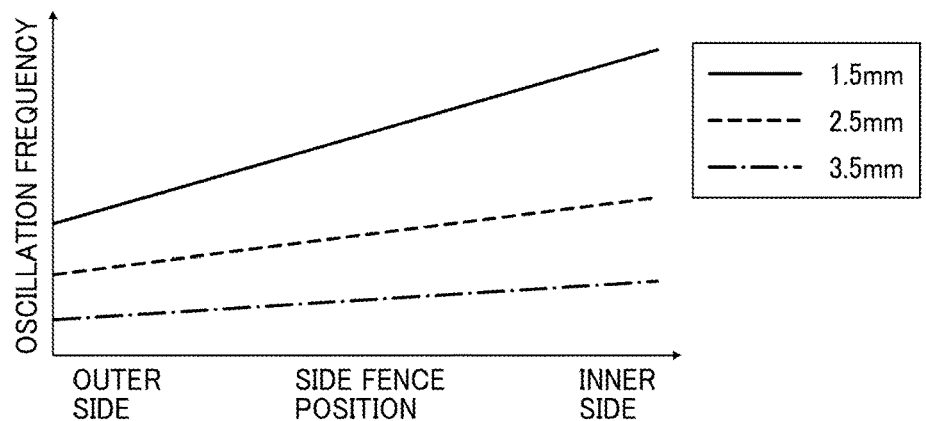
FIG. 34 is a graph of changes in oscillation frequency of a magnetic flux sensor corresponding to positions of a side fence according to an embodiment, for each different distance between a coil and a target.

FIG. 34 is graphs of oscillation frequency of the magnetic flux sensor 301 corresponding to the position of the side fence 292, for each of different distances from the planar coil 302 to the target 303. FIG. 34 is a graph abstained when the target 303 is magnetic. In FIG. 34, a solid line, broken lines, and alternate long and short dashed lines represent the graphs when the distance between the planar coil 302 and the target 303 is 1.5 mm, 2.5 mm, and 3.5 mm, respectively.

Referring to FIG. 34, as the distance between the planar coil 302 and the target 303 increases, the oscillation frequency lowers, and changes in oscillation frequency corresponding to the position of the side fence 292 become milder. Accordingly, to detect sheet size accurately, it is advantageous that the target 303 is close to the planar coil 302.

In view of the foregoing, in the present embodiment, the magnetic flux sensor 301 and the rack 296, to which the target 303 is provided, is pressed to each other, to keep an intended distance therebetween.

Figure 35:
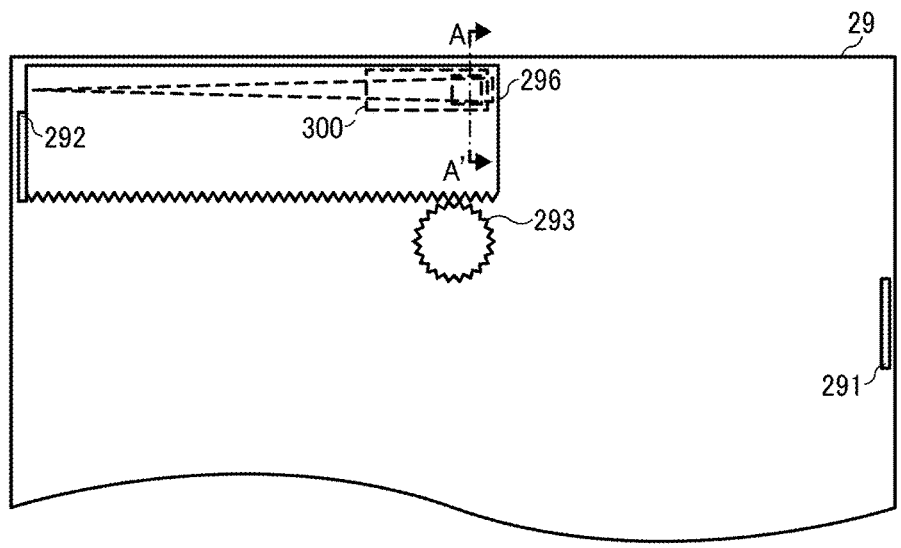
FIG. 35 is a view of a bypass tray according to another embodiment.
Figure 36:
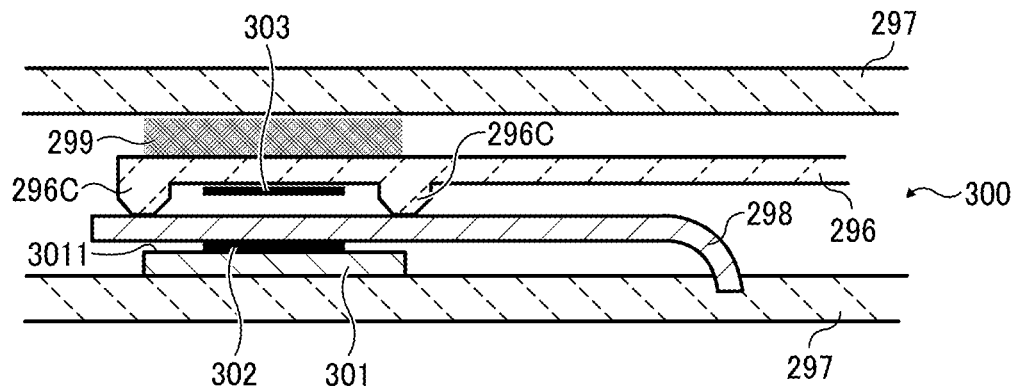
FIG. 36 is a cross-sectional view along line A-A' in FIG. 35 to illustrate a configuration of a sheet size detector according to another embodiment.

FIG. 35 is a view of the bypass tray 29 according to the fifth embodiment, with the sheet mounting face thereof on the front side of the paper on which FIG. 35 is drawn. FIG. 36 is a cross-sectional view along line A-A' in FIG. 35.

As illustrated in FIG. 36, in the bypass tray 29 according to the present embodiment, the rack 296 and the magnetic flux sensor 301 are contained in a housing 297. The front face 3011, which bears the planar coil 302, of the magnetic flux sensor 301 faces the rack 296 via a spacer 298. The rack 296 is pressed to the spacer 298 by an elastic body 299 such as sponge.

The rack 296 includes projections 296C projecting toward the spacer 298 (toward the magnetic flux sensor 301). With the configuration illustrated in FIG. 36, the rack 296 moves while the projections 296C contact a face of the spacer 298. The spacer 298 is stationary relative to the magnetic flux sensor 301 so that the planar coil 302 on the magnetic flux sensor 301 is not damaged. The spacer 298 is made of a material that is slidable and not conductive. For example, polyacetal resin is used.

With this configuration, inside the housing 297, a gap between the planar coil 302 and the target 303 is fixed in accordance with a thickness of the spacer 298. Accordingly, as described above, the change in oscillation frequency corresponding to the side fence 292 is made greater to enable sheet size detection with a higher degree of accuracy.

It is to be noted that the spacer 298 can be made of or include an insulator that is nonmagnetic, such as resin, glass, plastic, and the like.

A variation of the configuration illustrated in FIG. 36 is described below with reference to FIG. 37, which is a cross-sectional view along line A-A' in FIG. 35.

Figure 37:
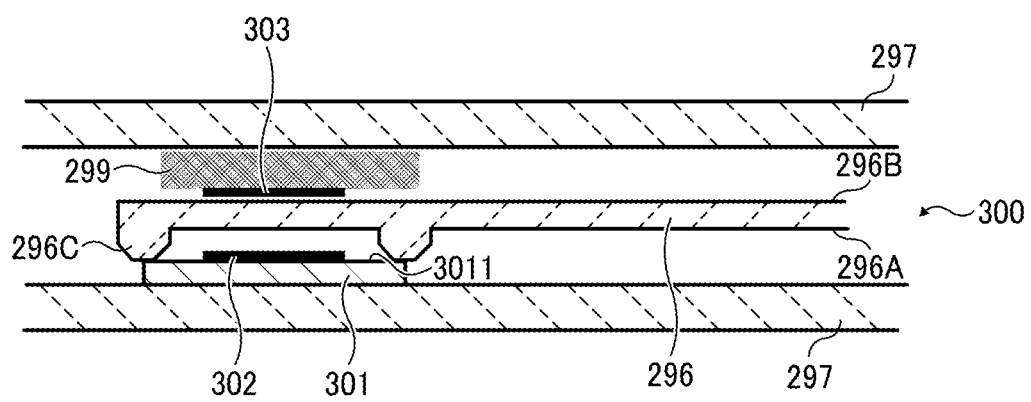
FIG. 37 is a cross-sectional view along line A-A' in FIG. 35 to illustrate a configuration of a sheet size detector according to another embodiment.

Similar to the configuration illustrated in FIG. 36, in the bypass tray 29 illustrated in FIG. 37, the rack 296 and the magnetic flux sensor 301 are contained in a housing 297. In FIG. 37, the magnetic flux sensor 301 directly faces the rack 296, and the projections 296C of the rack 296 are disposed to contact the magnetic flux sensor 301 in an area except the range of the planar coil 302.

The target 303 is on the second face 296B of the rack 296 opposite the first face 296A facing the magnetic flux sensor 301. The rack 296 is pressed to the magnetic flux sensor 301 by the elastic body 299. With the configuration illustrated in FIG. 37, the rack 296 moves while the projections 296C of the rack 296 contact the magnetic flux sensor 301 except the range of the planar coil 302.

With this configuration, inside the housing 297, the gap between the planar coil 302 and the target 303 is fixed in accordance with the shape of the rack 296. Specifically, the gap between the planar coil 302 and the target 303 is defined by the thickness of the rack 296 and the size of the projections 296C projecting from the rack 296 toward the magnetic flux sensor 301. Accordingly, similar to the configuration illustrated in FIG. 36, the change in oscillation frequency corresponding to the side fence 292 is made greater to enable sheet size detection with a higher degree of accuracy.

It is to be noted that, although the target 303 is on the side of the rack 296 opposite the side facing the magnetic flux sensor 301 in the configuration illustrated in FIG. 37, placement of the target 303 is not limited thereto. Alternatively, when sufficient space is secured by the projections 296C of the rack 296, the target 303 can be disposed on the side of the rack 296 facing the magnetic flux sensor 301. In this case, the gap between the planar coil 302 and the target 303 is defined by the size of the projections 296C projecting from the rack 296.

It is to be noted that exemplary configuration and mechanism of sheet feeding and sheet positioning can be found in U.S. patent application Ser. No. 13/855,112, filed on Apr. 2, 2013, and detailed descriptions relating to magnetic flux detection and control thereof can be found in U.S. patent application Ser. No. 14/256,141, filed on Apr. 18, 2014, the entire disclosure of each of which is hereby incorporated by reference herein.

Numerous additional modifications and variations are possible in light of the above teachings. It is therefore to be understood that, within the scope of the appended claims, the disclosure of this patent specification may be practiced otherwise than as specifically described herein.

What is claimed is:

1. A sheet size detector to detect a sheet size of a recording medium, the sheet size detector comprising:
   a movable member configured to move in a sheet size detection direction to a position corresponding to the sheet size;
   a magnetic flux detector including a coil disposed on a board face parallel to the sheet size detection direction, the coil configured to generate a magnetic flux in a direction perpendicular to the board face, the magnetic flux detector configured to output a signal corresponding to changes in magnetic flux in the direction perpendicular to the board face, the signal corresponding to the position of the movable member; and
   a target configured to oppose the board face and including a material to affect the magnetic flux, a size of the target changing in the sheet size detection direction to change the magnetic flux in the direction perpendicular to the board face according to movements of the movable member such that an oscillation frequency of the magnetic flux detector continuously increases as the movable member moves in the sheet size detection direction or continuously decreases as the movable member moves in the sheet size detection direction.

2. The sheet size detector according to claim 1, wherein the size of the target changes in the sheet size detection direction by an area of the target on a plane parallel to the board face changing in the sheet size detection direction.

3. The sheet size detector according to claim 1, wherein the size of the target changes in the sheet size detection direction by a thickness of the target in the direction perpendicular to the board face changing in the sheet size detection direction.

4. The sheet size detector according to claim 1, wherein a distance to the target from the board face changes in the sheet size detection direction according to the movement of the movable member.

5. The sheet size detector according to claim 1, wherein changes in the size of the target depend on a position in the sheet size detection direction.

6. The sheet size, detector according to claim 5, wherein the changes in the size of the target in the sheet size detection direction are configured to cause uniform changes in magnetic flux in the direction perpendicular to the board face per distance moved by the movable member.

7. The sheet size detector according to claim 1, further comprising an insulator disposed between the coil and the target.

8. The sheet size detector according to claim 1, wherein the coil is planar and made of wire printed on the board face of the magnetic flux detector.

9. The sheet size detector according to claim 1, wherein the target comprises multiple portions different in material and disposed at different positions in the sheet size detection direction.

10. The sheet size detector according to claim 1, further comprising a pressing member to press the target to the magnetic flux detector.

11. The sheet size detector according to claim 10, further comprising a spacer disposed between the target and the magnetic flux detector,
wherein the pressing member is to press the target to the magnetic flux detector via the spacer.

12. The sheet size detector according to claim 10, wherein the target is secured to the movable member to move together with the movable member, and
the target is disposed on a side of the movable member opposite the magnetic flux detector.

13. An image processing apparatus comprising:
a sheet size detector to detect a sheet size of a recording medium, the sheet size detector including
a movable member configured to move in a sheet size detection direction to a position corresponding to the sheet size,
a magnetic flux detector including a coil disposed on a board face parallel to the sheet size detection direction, the coil configured to generate a magnetic flux in a direction perpendicular to the board face, the magnetic flux detector configured to output a signal corresponding to changes in magnetic flux in the direction perpendicular to the board face, the signal corresponding to the position of the movable member, and
a target configured to oppose the board face and including a material to affect the magnetic flux, a size of the target changing in the sheet size detection direction to change the magnetic flux in the direction perpendicular to the board face according to movement of the movable member such that an oscillation frequency of the magnetic flux detector continuously increases as the movable member moves in the sheet size detection direction or continuously decreases as the movable member moves in the sheet size detection direction.

14. The image processing apparatus according to claim 13, wherein a distance to the target from the board face changes in the sheet size detection direction according to the movement of the movable member.

15. The image processing apparatus according to claim 13, wherein changes in the size of the target depend on a position in the sheet size detection direction.

16. The image processing apparatus according to claim 13, further comprising an insulator disposed between the coil and the target.

17. The image processing apparatus according to claim 13, wherein the coil is planar and made of wire printed on the board face of the magnetic flux detector.

18. The image processing apparatus according to claim 13, wherein the target comprises multiple portions different in material and disposed at different positions in the sheet size detection direction.

19. A sheet size detector to detect a sheet size of a recording medium, the sheet size detector comprising:
a movable member configured to move in a sheet size detection direction to a position corresponding to the sheet size;
a magnetic flux detector including a planar coil and a planar resistor, the planar coil disposed on a board face parallel to the sheet size detection direction, and the planar resistor patterned on the board face, the planar coil configured to generate a magnetic flux in a direction perpendicular to the board face, the magnetic flux detector configured to output a signal corresponding to changes in magnetic flux in the direction perpendicular to the board face, the signal corresponding to the position of the movable member; and
a target configured to oppose the board face and including a material to affect the magnetic flux, a size of the target changing in the sheet size detection direction to change the magnetic flux in the direction perpendicular to the board face according to movements of the movable member such that an oscillation frequency of the magnetic flux detector continuously increases as the movable member moves in the sheet size detection direction or continuously decreases as the movable member moves in the sheet size detection direction.

* * * * *